US010384469B2

(12) United States Patent
Kagata et al.

(10) Patent No.: US 10,384,469 B2
(45) Date of Patent: Aug. 20, 2019

(54) INK JET RECORDING METHOD AND METHOD OF CONTROLLING INK JET RECORDING APPARATUS

(71) Applicant: Seiko Epson Corporation, Tokyo (JP)

(72) Inventors: Takayoshi Kagata, Shiojiri (JP); Hitoshi Ohta, Shiojiri (JP); Akiko Matsuzaki, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/854,940

(22) Filed: Dec. 27, 2017

(65) Prior Publication Data

US 2018/0236787 A1 Aug. 23, 2018

(30) Foreign Application Priority Data

Feb. 22, 2017 (JP) ................................ 2017-031012

(51) Int. Cl.

| | |
|---|---|
| ***B41J 11/00*** | (2006.01) |
| ***B41J 2/175*** | (2006.01) |
| ***B41M 5/00*** | (2006.01) |
| ***C09D 11/32*** | (2014.01) |
| ***B41J 2/14*** | (2006.01) |
| ***B41J 2/165*** | (2006.01) |
| ***B41J 2/21*** | (2006.01) |

(52) U.S. Cl.

CPC ........... *B41J 11/0015* (2013.01); *B41J 2/165* (2013.01); *B41J 2/17513* (2013.01); *B41J 2/17566* (2013.01); *B41J 2/2114* (2013.01); *B41M 5/0017* (2013.01); *B41M 5/0047* (2013.01); *B41M 5/0064* (2013.01); *B41M 5/0011* (2013.01)

(58) Field of Classification Search

CPC .. B41J 11/0015; B41J 2/17566; B41J 2/1433; B41M 5/0017; B41M 5/0011; C09D 11/322

See application file for complete search history.

(56) References Cited

U.S. PATENT DOCUMENTS

| | | | |
|---|---|---|---|
| 5,609,671 | A | 3/1997 | Nagasawa |
| 5,928,419 | A | 7/1999 | Uemura et al. |
| 5,976,233 | A | 11/1999 | Osumi et al. |
| 6,123,759 | A | 9/2000 | Mise et al. |
| 6,136,286 | A | 10/2000 | Okuyama et al. |
| 2006/0057339 | A1 | 3/2006 | Adachi et al. |

(Continued)

FOREIGN PATENT DOCUMENTS

| | | | |
|---|---|---|---|
| JP | 62-001426 | B2 | 1/1987 |
| JP | 03-056573 | A | 3/1991 |

(Continued)

*Primary Examiner* — Jason S Uhlenhake

(74) *Attorney, Agent, or Firm* — Harness, Dickey & Pierce, P.L.C.

(57) ABSTRACT

An ink jet recording method includes attaching a treating liquid, in which a content of a nitrogen-containing solvent is greater than that of an ink composition, to a recording medium having low or non-absorbability in which a step of surface unevenness is equal to or greater than 10 μm, and attaching the ink composition containing the nitrogen-containing solvent by discharging the ink composition from an ink jet head to the recording medium to which the treating liquid is attached.

20 Claims, 1 Drawing Sheet

(56) References Cited

U.S. PATENT DOCUMENTS

| | | | | |
|---|---|---|---|---|
| 2010/0196604 | A1* | 8/2010 | Kariya | C09D 11/322<br>427/288 |
| 2016/0121611 | A1* | 5/2016 | Reinten | B41J 2/14233<br>347/71 |
| 2017/0166768 | A1 | 6/2017 | Matsuzaki et al. | |

FOREIGN PATENT DOCUMENTS

| | | | | |
|---|---|---|---|---|
| JP | 03-079678 | A | | 4/1991 |
| JP | 03-160068 | A | | 7/1991 |
| JP | 04-018462 | A | | 1/1992 |
| JP | 07-258578 | A | | 10/1995 |
| JP | 08-003498 | A | | 1/1996 |
| JP | 08-283596 | A | | 10/1996 |
| JP | 10-110110 | A | | 4/1998 |
| JP | 10-110111 | A | | 4/1998 |
| JP | 10-110114 | A | | 4/1998 |
| JP | 10-120958 | A | | 5/1998 |
| JP | 10-195331 | A | | 7/1998 |
| JP | 10-195360 | A | | 7/1998 |
| JP | 10-237349 | A | | 9/1998 |
| JP | 10-330665 | A | | 12/1998 |
| JP | 2005-138502 | A | | 6/2005 |
| JP | 2005138502 | A | * | 6/2005 |
| JP | 2017-013350 | A | | 1/2017 |
| JP | 2017-110185 | A | | 6/2017 |

* cited by examiner

INK JET RECORDING METHOD AND METHOD OF CONTROLLING INK JET RECORDING APPARATUS

BACKGROUND

1. Technical Field

The present invention relates to an ink jet recording method and a method of controlling an ink jet recording apparatus.

2. Related Art

An ink jet recording method of discharging minute ink droplets from a recording head nozzle of an ink jet recording apparatus so as to record an image on a recording medium has been known, and applications thereof in a sign printing field and a high-speed label printing field have been considered. In addition, in a case where recording is performed on a recording medium having low ink absorbability (for example, art paper or coated paper) or a recording medium having non-ink absorbability (for example, a plastic film), using a water-based resin ink composition containing resin emulsion (hereinafter, also referred to as “water-based ink” or “ink”) as ink has been considered from the viewpoint of global environment and human safety. Further, when the recording is performed on the recording medium having low (non) absorbability with the water-based resin ink composition, in order to fix the ink at an early stage and to improve image quality without increasing a primary heating temperature after recording, a treating liquid containing an aggregating agent of the ink may be used in some cases.

Here, in a case where a recording medium such as polyvinyl chloride banner or embossed media, which has non (low) absorbability and large surface unevenness, is used for soft signature or wallpaper, the water-based ink has low fixability, and thus a technique of securing the fixability of the water-based ink by using the treating liquid containing a nitrogen-containing solvent has been known (for example, refer to JP-A-2005-138502).

However, there is a problem in that abrasion resistance of the obtained image is deteriorated in a case where the recording is performed with the treating liquid containing a nitrogen-containing solvent and an ink composition on the recording medium having non (low) absorbability and large surface unevenness. As a cause, it is presumed that when a step of the unevenness on the recording medium is large, the treating liquid flows from a convex portion to a concave portion, and thus the solubility of the resin contained in the ink in the convex portion is insufficient and the abrasion resistance of the obtained image is deteriorated. In this regard, increasing the nitrogen-containing solvent in the ink is also conceivable; however, as the nitrogen-containing solvent in the ink is increased, the resin contained in the ink is dissolved in the ink jet head, and thereby the ink jet head and the nozzle are clogged, and the discharging stability of the ink is deteriorated.

SUMMARY

An advantage of some aspects of the invention is to provide an ink jet recording method and a method of controlling an ink jet recording apparatus which are capable of forming an image excellent in abrasion resistance and having excellent discharging stability of ink.

The invention can be realized in the following aspects or application examples.

Application Example 1

According to an aspect of the invention, there is provided a recording method including attaching a treating liquid, in which a content of a nitrogen-containing solvent is greater than that of an ink composition, to a recording medium having low or non-absorbability in which a step of surface unevenness is equal to or greater than 10 μm; attaching the ink composition containing the nitrogen-containing solvent by discharging the ink composition from an ink jet head to the recording medium to which the treating liquid is attached.

According to the application example, when the treating liquid in which the content of the nitrogen-containing solvent is greater than the ink composition is attached to the recording medium before the attachment of the ink composition, it is possible to secure the solubility of the resin of the ink in the convex portion of the recording medium and to record an image excellent in the abrasion resistance. In addition, the content of the nitrogen-containing solvent in the ink composition is less than the content of the nitrogen-containing solvent in the treating liquid, and thus it is possible to suppress the solubility of the resin contained in the ink in the ink jet head, and thereby it is possible to provide an ink jet recording method excellent in the discharge stability by preventing the clogging of the ink jet head and nozzle.

Application Example 2

In the application example, the recording medium may have a recording surface with a resinous front surface.

According to the application example, even in a case of using the recording medium which has the resinous front surface of the recording surface, an image excellent in the abrasion resistance can be formed, and an ink jet recording method excellent in the ink discharge stability can be provided.

Application Example 3

In the application example, the treating liquid may contain an aggregating agent for aggregating components of the ink composition.

According to the application example, when the treating liquid contains the aggregating agent for aggregating the components of the ink composition, it is possible to improve the image quality of the formed image.

Application Example 4

In the application example, the content of the nitrogen-containing solvent in the treating liquid may be in a range of 3% by mass to 25% by mass, and the content of the nitrogen-containing solvent in the ink composition may be in a range of 1% by mass to 23% by mass.

According to the application example, when the content of the nitrogen-containing solvent in the treating liquid and the ink composition is within the above range, an image excellent in the abrasion resistance can be formed, and an ink jet recording method excellent in the ink discharge stability can be provided.

Application Example 5

In the application example, in the ink composition, a content of an organic solvent having a standard boiling point of equal to or higher than 280° C. may be equal to or less than 3% by mass.

According to the application example, dryability of the ink composition on the recording medium is improved, it is possible to form an excellent image in which occurrence of bleeding is suppressed.

Application Example 6

In the application example, the ink composition may contain an organic solvent having low permeability with respect to the recording medium as compared with the nitrogen-containing solvent.

According to the application example, when the ink composition contains the organic solvent having low permeability with respect to the recording medium as compared with the nitrogen-containing solvent, an image excellent in the abrasion resistance can be formed, and an ink jet recording method excellent in the ink discharge stability can be provided.

Application Example 7

In the application example, a step of surface unevenness of the recording medium may be in a range of 10 μm to 200 μm.

According to the application example, even in a case where the step of the surface unevenness of the recording medium is in a range of 10 μm to 200 μm, an image excellent in the abrasion resistance can be formed, and an ink jet recording method excellent in the ink discharge stability can be provided.

Application Example 8

In the application example, the ink jet head may have a step in a flow path through which the ink composition passes between a pressure chamber and a nozzle.

According to the application example, for example, when a nozzle is formed by etching a nozzle plate (a silicon layer), the step is formed in the flow path through which the ink passes between the pressure chamber and the nozzle, ink films are accumulated due to the retention of the ink composition in the step, and thereby landing deviation of the ink at the time of continuous printing, and nozzle clogging are likely to occur. However, according to the ink jet recording method of Application Example 8, even with the ink jet head having such a structure, the accumulation of the ink films in the step can be reduced, and thus an ink jet recording method excellent in the ink discharge stability can be provided.

Application Example 9

In the application example, a pressure chamber of the ink jet head may include a retention portion in which the ink composition is retained in a direction extending from an outflow port in an ink movement direction which is formed by connecting a supply port through which the ink composition is supplied to the pressure chamber to the outflow port to which the ink composition outflows from the pressure chamber.

According to the application example, when the pressure chamber of the ink jet head includes such a retention portion in which the ink is retained, ink films are accumulated, and there thereby landing deviation of the ink at the time of continuous printing, and nozzle clogging are likely to occur. However, according to the ink jet recording method of Application Example 9, even with the ink jet head having such a structure, the accumulation of the ink films in the retention portion can be reduced, and thus an ink jet recording method excellent in the ink discharge stability can be provided.

Application Example 10

In the application example, the ink composition may contain a resin.

According to the application example, even in a case where the ink composition contains the resin, an ink jet recording method excellent in the ink discharge stability can be provided.

Application Example 11

According to another aspect of the invention, there is provided a method of controlling an ink jet recording apparatus, the method includes controlling an ink jet recording apparatus to perform recording by the ink jet recording method according to any one of Application Example 1 to Application Example 10.

According to the application example, for example, in the ink jet recording apparatus which performs recording by the ink jet recording method according to any one of Application Example 1 to Application Example 10, it is possible to perform the recording for one hour or more without performing a maintenance step of discharging ink from the ink jet head by using a unit other than a pressure generation unit for discharging ink to perform recording. According to the application examples, the recording is performed by the above-described ink jet recording method, and thus it is possible to realize ink jet recording excellent in the discharge stability for one hour or more without particularly performing the maintenance step.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the present invention will be described below. The embodiments described below explain one example of the invention. The invention is not limited to the following embodiments at all, and includes various modifications that are carried out without changing the gist of the invention.

An ink jet recording method according to the embodiment includes a treating liquid attaching step of attaching a treating liquid, in which a content of a nitrogen-containing solvent is greater than that of an ink composition, to a recording medium having low or non-absorbability in which a step of surface unevenness is equal to or greater than 10 μm, and an ink attaching step of attaching the ink composition containing the nitrogen-containing solvent by discharging the ink composition from an ink jet head to the recording medium to which the treating liquid is attached.

Hereinafter, regarding the ink jet recording method according to the embodiment, an ink jet recording apparatus which performs recording by using this recording method, an ink composition (hereinafter, also referred to as "ink"), a treating liquid, and an ink jet recording method will be described in this order.

1. CONFIGURATIONS

1.1. Ink Jet Recording Apparatus

An example of an ink jet recording apparatus in which the recording method according to the embodiment is executed will be described with reference to the drawings. Note that, the ink jet recording apparatus that can be used for the recording method according to the embodiment is not limited to the following examples.

Figure 1:
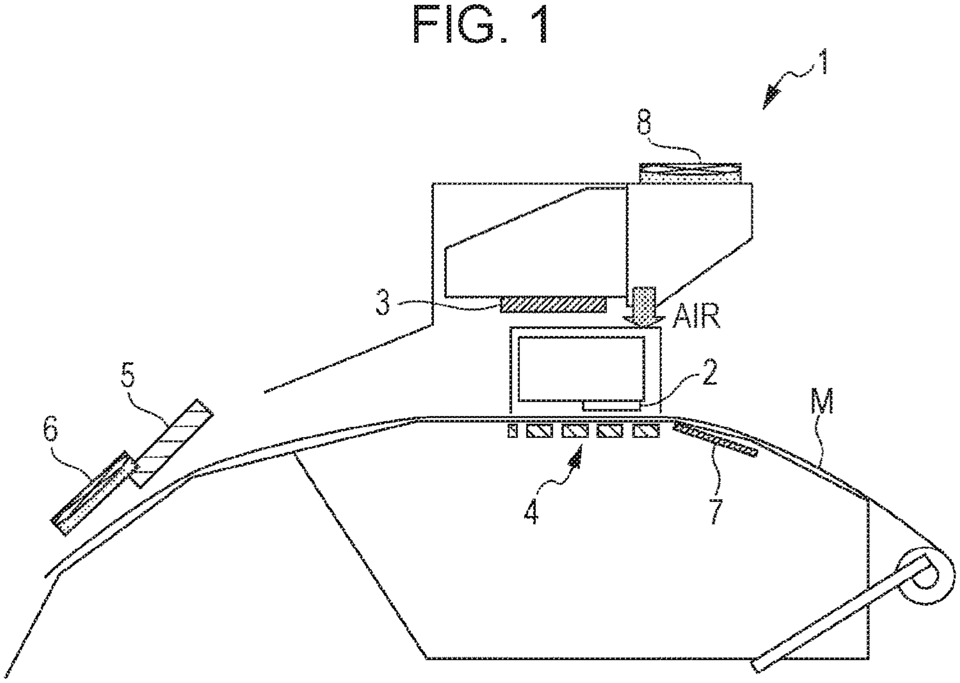
FIG. 1 is a schematic sectional view schematically illustrating an ink jet recording apparatus.

An example of the ink jet recording apparatus that can be used in the ink jet recording apparatus used in the embodiment will be described with reference to the drawings. FIG. 1 is a schematic sectional view schematically illustrating an ink jet recording apparatus. As illustrated in FIG. 1, an ink jet recording apparatus 1 is provided with an ink jet head 2, an IR heater 3, a platen heater 4, a hardening heater 5, a cooling fan 6, a preheater 7, and a ventilation fan 8. The ink jet recording apparatus 1 is provided a control unit (not shown), and an operation of the entire ink jet recording apparatus 1 is controlled by the control unit.

Figure 2:
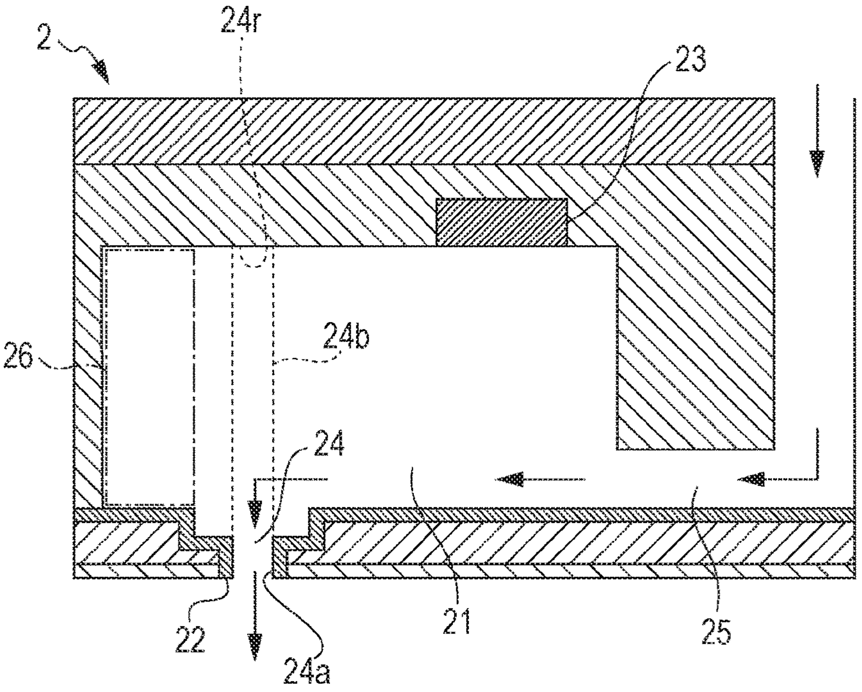
FIG. 2 is a schematic sectional view schematically illustrating a structure of an ink jet head as illustrated in FIG. 1.

The ink jet head 2 is a unit that discharges and attaches the ink composition to the recording medium M, and for example, ones having the type illustrated in in FIG. 2 can be used.

The ink jet head 2 is provided with a nozzle 22 for discharging an ink composition and a reaction liquid containing an aggregating agent for aggregating components of the ink composition. Examples of a method of discharging ink from a nozzle include a method of applying a strong electric field between a nozzle and an accelerating electrode placed in front of the nozzle to continuously discharge droplet-like ink from the nozzle, and discharging the ink corresponding to a recording information signal while the ink droplet flies between deflecting electrodes (an electrostatic suction method); a method of applying pressure to ink with a small pump and mechanically vibrating the nozzle with a crystal oscillator or the like so as to forcibly discharge the ink droplet; a method of applying a pressure and a recording information signal to ink at the same time with a piezoelectric element so as to discharge the ink droplet and perform recording (a piezo method); and a method of heating and foaming ink with a microelectrode in accordance with a recording information signal so as to discharge the ink droplet and perform recording (a thermal jet method).

As the ink jet head 2, any of a line type ink jet head and a serial type ink jet head can be used. In particular, in the following embodiment, the serial type ink jet head is used.

Here, the ink jet recording apparatus which is provided with the serial type ink jet head performs recording by performing scanning (passing) for discharging the ink composition while moving the ink jet head for recording relative to the recording medium a plurality of times. Specific examples of the serial type ink jet head include an ink jet head which is mounted on a carriage which moves in the width direction of the recording medium (the direction interacting with the transport direction of the recording medium), and is moved as the carriage moves so as to discharge liquid droplets onto the recording medium.

On the other hand, ink jet recording apparatus provided with the line type ink jet head performs recording by performing scanning (passing) for discharging the ink composition while moving the ink jet head for recording relative to the recording medium once. Specific examples of the line type ink jet head include an ink jet head which is formed to be wider than the width of the recording medium and discharges liquid droplets onto the recording medium without moving the recording head.

In the embodiment, as the ink jet recording apparatus 1, the ink jet recording apparatus provided with the serial type ink jet head is used, and the ink jet head 2 (which uses the piezo method as a method of discharging ink from the nozzle) is used.

FIG. 2 is a schematic sectional view schematically illustrating a structure of the ink jet head 2. In FIG. 2, arrows indicate the movement direction of ink. The ink jet head 2 is provided with a pressure chamber 21 and a piezoelectric element 23 which discharges the ink composition from the nozzle 22 by applying the pressure to the pressure chamber 21. In the pressure chamber 21, a piezoelectric element 23 is disposed at a position other than a position 24*r* facing an outflow port 24 communicating with the nozzle 22. In a case where the piezoelectric element 23 is provided immediately above the nozzle 22, an extrusion force of the ink from the piezoelectric element 23 is also directly transmitted to the ink film attached to a nozzle wall surface 24*a*, and thus it is possible to eliminate the attachment of the ink film; whereas in a case where the piezoelectric element 23 is not provided immediately above the nozzle 22, it is difficult to eliminate the attachment of the ink film, and thus the ink jet recording method according to the embodiment is useful.

Here, the position 24*r* facing the outflow port 24 which communicates with the nozzle 22 in the pressure chamber 21 means a position immediately above the nozzle 22, and in FIG. 2, if a line (which is indicated as a broken line in FIG. 2) is extended from the wall surface 24*a* of the outflow port 24 to the upper side in FIG. 2), the position 24*r* means an area surrounded by an extension line 24*b* and an extension line 24*b*. For example, in the case of the ink jet head 2 in FIG. 2, regarding the outflow port 24, the outflow port 24 is not a part which is widened in the middle, but is a part in which an area in the direction orthogonal to the direction to which the ink is discharged is the same as that of the nozzle 22. Accordingly, the fact that the piezoelectric element 23 is disposed at a position other than the opposing position 24*r* means that at least a part of the piezoelectric element 23 is not positioned at least in a part of (the position 24*r* facing) this position.

The pressure chamber 21 includes a retention portion 26 in which ink is retained in the direction extending from the ink movement direction connecting a supply port 25 through which ink is supplied to the pressure chamber 21, and to the outflow port 24 of the pressure chamber 21. The retention portion 26 is a portion formed in a step of mass producing the ink jet head 2, and thus it is difficult to mass-produce an ink jet head provided with a pressure chamber without the retention portion 26. In this retention portion 26, the ink composition is likely to stagnate and an ink dried matter (a resin welded matter) is likely to accumulate. When bubbles are collected so as to create a space, the ink dried matter is attached to the wall surface. On the other hand, according to the ink jet recording method in the embodiment, even with the ink jet head 2 having such a structure, accumulation of the ink dried matters can be reduced in the retention portion

26, and it is possible to provide an ink jet recording method excellent in the ink discharge stability.

The ink jet head 2 also includes a step in a flow path through which the ink passes between the pressure chamber 21 and the nozzle 22. This step is a portion that is generated when the nozzle 22 is formed by etching a silicon layer (a nozzle plate), and thus it is difficult to form a nozzle plate without a step by etching the silicon layer. This step is not limited to be formed in the nozzle plate as long as it is formed between the outflow port 24 and the nozzle 22 of the pressure chamber 21. The bubbles may be attached to remain on the step during initial filling or cleaning of the ink, and the bubbles are floated from a step portion during recording and collected above the pressure chamber, and in the position where the bubbles are collected, a gas-liquid interface is generated to dry the ink, and thereby an ink dried matter (resin welded matter) is generated. In contrast, according to the ink jet recording method in the embodiment, even with such a step, the accumulation of the ink dried matters can be reduced in the step, and it is possible to provide an ink jet recording method excellent in the ink discharge stability.

In the embodiment, a plurality of the pressure chamber 21, discharge driving units (not shown), and the nozzles 22 provided for each of the pressure chamber 21 of the ink jet head 2 each may be independently provided on one head. Here, discharge driving unit can be formed by using an electromechanical conversion element such as a piezoelectric element 23 for changing the volume of the pressure chamber 21 by mechanical deformation, and an electrothermal conversion element for emitting heat so as to generate and discharge bubbles to the ink.

Returning to FIG. 1, the ink jet recording apparatus 1 includes the IR heater 3 and the platen heater 4 for heating the recording medium M at the time of discharging the ink composition from the ink jet head 2. In the embodiment, when the recording medium M is heated in the attaching step of the ink composition, at least one of the IR heater 3 and the platen heater 4 may be used.

Note that, when the IR heater 3 is used, it is possible to heat the recording medium M from the ink jet head 2 side. With this, the ink jet head 2 is likely to be heated at the same time, but as compared with the case of heating the rear surface of the recording medium M by the platen heater 4, it is possible to raise the temperature without being affected by the thickness of the recording medium M. Further, when the platen heater 4 is used at that time of heating the recording medium M, it is possible to heat the recording medium M from the side opposite to the ink jet head 2 side. With this, the ink jet head 2 is relatively less likely to be heated. Here, the surface temperature of the recording medium M by the IR heater 3 or the platen heater 4 is preferably equal to or lower than 40° C., and is further preferably equal to or lower than 35° C. With this, the radiation heat received from the IR heater 3 and the platen heater 4 is reduced or eliminated, and thus drying of the ink composition and composition variation thereof in the ink jet head 2 can be suppressed, and welding of the resin to the inner wall of the ink jet head 2 can be reduced.

The hardening heater 5 is for drying and solidifying the ink composition recorded on the recording medium M. When the hardening heater 5 heats the recording medium M on which the image is recorded, the moisture contained in the ink composition more rapidly evaporates and the ink film is formed by the resin fine particles contained in the ink composition. In this way, the ink film firmly fixes (attaches) to the recording medium M, and thus it is possible to obtain a high-quality image excellent in abrasion resistance in a short time. The drying temperature by the hardening heater 5 is preferably in a range of 40° C. to 120° C., is further preferably in a range of 60° C. to 100° C., and is still further preferably in a range of 80° C. to 90° C.

The ink jet recording apparatus 1 may include a cooling fan 6. After drying the ink composition recorded on the recording medium M, the ink composition on the recording medium M is cooled by the cooling fan 6 so that an ink film can be formed on the recording medium M with good adhesion.

In addition, the ink jet recording apparatus 1 may include a preheater 7 for previously heating (preheating) a recording medium M before discharging the ink composition on the recording medium M. Further, the recording apparatus 1 may include a ventilation fan 8 such that the ink composition attached on the recording medium M is more efficiently dried.

1.2. Ink Composition

Next, the ink composition used in the ink jet recording method according to the embodiment will be described. The ink composition used in the embodiment contains, for example, a coloring material, a resin component, an organic solvent, a surfactant, and water. Since such an ink composition has excellent ink dryability, it can be preferably used for printing the recording medium having non-ink absorbability or ink low absorbability. Hereinafter, components contained in the ink composition in the embodiment will be described.

1.2.1. Coloring Material

The ink composition used in the embodiment may contain a coloring material. Examples of the coloring material include dyes and pigments, and the pigment has a property of being resistant to discoloration against light, gas, and the like, and thus is preferably used. For this reason, an image formed on a recording medium having non-ink absorbability or low ink absorbability using a pigment is excellent in water resistance, gas resistance, light resistance, and the like, and has excellent storage stability.

The pigments which can be used in the embodiment are not particularly limited, and examples thereof include an inorganic pigment and an organic pigment. Examples of the inorganic pigment include titanium oxide, iron oxide, and carbon black manufactured by a known method such as a contact method, a furnace method, and a thermal method. On the other hand, examples of the organic pigment include an azo pigment (such as azolake, an insoluble azo pigment, a condensed azo pigment, and a chelate azo pigment), a polycyclic pigment (such as a phthalocyanine pigment, a perylene pigment, a perinone pigment, an anthraquinone pigment, and a quinophthalone pigment), a nitro pigment, a nitroso pigment, and aniline black.

Among the specific examples of the pigments which are can be used in the embodiment, carbon black is exemplified as a black pigment. The carbon black not particularly limited, and examples thereof include Furnace Black, Lamp Black, Acetylene Black, and Channel Black (C.I. Pigment Black 7), and commercially available products such as No. 2300, 900, MCF88, No. 20B, No. 33, No. 40, No. 45, No. 52, MA7, MA8, MA77, MA100, and No. 2200B (which are all manufactured by Mitsubishi Chemical Corporation), Color Blacks FW1, FW2, FW2V, FW18, FW200, S150, S160, S170, Printexs 35, U, V, and 140U, Special Blacks 6, 5, 4A, 4, and 250 (which are all manufactured by Evonik Degussa Gmbh), Conductex SC, Ravens 1255, 5750, 5250, 5000, 3500, 1255, and 700 (which are all manufactured by Columbia), Regals 400R, 330R, and 660R, Mogul L, Monarchs 700, 800, 880, 900, 1000, 1100, 1300, and 1400, and Elftex 12 (which are all manufactured by Cabot Corporation).

The white pigment is not particularly limited, and examples thereof include C.I. Pigment Whites 6, 18, and 21, a white inorganic pigment of titanium oxide, zinc oxide, zinc sulfide, antimony oxide, magnesium oxide, and zirconium oxide. In addition to the white inorganic pigment, a white organic pigment such as white hollow resin particles and polymer particles can be used.

A pigment used for the yellow ink is not particularly limited, and examples thereof include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

A pigment used for the magenta ink is not particularly limited, examples thereof include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violets 19, 23, 32, 33, 36, 38, 43, and 50.

A pigment used for the cyan ink is not particularly limited, and examples thereof include C.I. Pigment Blues 1, 2, 3, 15, 15:1, 15:2, 15:3, 15:34, 15:4, 16, 18, 22, 25, 60, 65, and 66, and C.I. Bad Blues 4 and 60.

A pigment used for color ink other than magenta, cyan, and yellow is not particularly limited, and examples thereof include C.I. Pigment Greens 7 and 10, C.I. Pigment Brown 3, 5, 25, and 26, C.I. Pigment Orange 1, 2, 5, 7, 13, 14, 15, 16, 24, 34, 36, 38, 40, 43, and 63.

A pearl pigment is not particularly limited, and examples thereof include a pigment having pearly luster and interference gloss such as titanium dioxide-coated mica, fish scale foil, and bismuth oxychloride.

A metallic pigment is not particularly limited, but examples thereof include particles made of a monomer such as aluminum, silver, gold, platinum, nickel, chromium, tin, zinc, indium, titanium, and copper, or an alloy thereof.

The content of the coloring material contained in the ink composition is preferably in a range of 1.5% by mass to 10% by mass, and is further preferably in a range of 2% by mass to 7% by mass, with respect to the total mass of the ink composition.

In order to apply the pigment to the ink composition, it is necessary to stably disperse and retain the pigment in water. Examples of the method thereof include a method of dispersing a pigment with a resin dispersant such as a water-soluble and/or a water dispersible resin (hereinafter, a pigment which is dispersed by this method is referred to as a "resin dispersed pigment"), a method of dispersing a pigment with a surfactant of a water-soluble surfactant and/or a water-dispersible surfactant (hereinafter, a pigment which is dispersed by this method is referred to as a "surfactant dispersed pigment"), and a method of dispersing and/or dissolving a pigment in water without a dispersant such as the above-mentioned resin or surfactant by chemically and physically introducing a hydrophilic functional group to a pigment particle surface (hereinafter, a pigment which is dispersed by this method is referred to as a "surface treated pigment"). In the embodiment, as the ink composition, any of a resin dispersed pigment, a surfactant dispersed pigment, and a surface treated pigment can be used, and it is also possible to use a mixture of plural kinds of pigments as necessary.

Examples of the resin dispersant used in the resin dispersed pigment include polyvinyl alcohols, a polyvinyl pyrrolidones, a polyacrylic acid, an acrylic acid-acrylonitrile copolymer, a vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, and a vinyl acetate-acrylic acid copolymer, and salts thereof. Among them, a copolymer of a monomer having a hydrophobic functional group and a monomer having a hydrophilic functional group, and a polymer consisting of a monomer having both a hydrophobic functional group and a hydrophilic functional group are particularly preferable. As a form of the copolymer, any of a random copolymer, a block copolymer, an alternating copolymer, and a graft copolymer can be used.

Examples of the salt include a basic compound such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, and morpholine, and a salt. The additional amount of these basic compounds is not particularly limited as long as it is not less than the neutralization equivalent of the resin dispersant.

A molecular weight of the resin dispersant as a weight average molecular weight is preferably in a range of 1,000 to 100,000, and is further preferably in a range of 3,000 to 10,000. When the molecular weight is within the above range, stable dispersion of the coloring material can be obtained in water and it is easy to perform viscosity control when the coloring material is applied to the ink composition.

A commercially available product can also be used as the above-described resin dispersant. Specifically, examples thereof include JONCRYL 67 (weight average molecular weight: 12,500, acid value: 213), JONCRYL 678 (weight average molecular weight: 8,500, acid value: 215), JONCRYL 586 (weight average molecular weight: 4,600, acid value: 108), JONCRYL 611 (weight average molecular weight: 8,100, acid value: 53), JONCRYL 680 (weight average molecular weight: 4,900, acid value: 215), JONCRYL 682 (weight average molecular weight: 1,700, acid value: 238), JONCRYL 683 (weight average molecular weight: 8,000, acid value: 160), and JONCRYL 690 (weight average molecular weight: 16,500, acid value: 240) (product names, manufactured by BASF Japan Ltd).

Examples of the surfactant used for the surfactant dispersed pigment include an anionic surfactant such as alkanesulfonate, α-olefin sulfonate, alkyl benzene sulfonate, alkyl naphthalene sulfonate, acyl methyl taurate, dialkyl sulfosuccinate, alkyl sulfate ester salt, sulfated olefin, polyoxyethylene alkyl ether sulfate ester salt, alkyl phosphate ester salt, polyoxyethylene alkyl ether phosphoric acid ester salt, and monoglycerite phosphate ester salt; an amphoteric surfactant such as alkyl pyridium salt, alkyl amino acid salt, and alkyl dimethyl betaine; and a nonionic surfactant, polyoxyethylene alkyl ether, polyoxyethylene alkyl phenyl ether, polyoxyethylene alkyl ester, polyoxyethylene alkyl amide, glycerin alkyl ester, and sorbitan alkyl ester.

The additional amount of the pigment of the resin dispersant or the surfactant is preferably in a range of 1 part by mass to 100 parts by mass, is further preferably in a range of 5 parts by mass to 50 parts by mass, with respect to 100 parts by mass of pigment. When the additional amount is within the above range, it is possible to secure the dispersion stability of the pigment in water.

In addition, as the surface treated pigment, a hydrophilic functional group is exemplified and examples thereof include —OM, —COOM, —CO—, —$SO_3M$, —$SO_2NH_3$, —$RSO_3M$, —$PO_3HM$, —$PO_3M_3$, —$SO_3NHCOR$, —$NH_3$, and —$NR_3$ (here, in the formula, M represents a hydrogen atom, an alkali metal, an ammonium, or an organic ammonium, R represents an alkyl group having 1 to 12 carbon atoms, a phenyl group which may have a substituent, or a naphthyl group which may have a substituent). These functional groups are introduced physically and/or chemically by being grafted to the pigment particle surface directly and/or via other groups. Examples of the polyvalent group include an alkylene group having 1 to 12 carbon atoms, a phenylene group which may have a substituent, or a naphthylene group which may have a substituent.

In addition, preferable examples of the surface treated pigment include a pigment which is surface-treated such that —$SO_3M$ and/or —$RSO_3M$ (M is a counter ion, and represents a hydrogen ion, an alkali metal ion, an ammonium ion, or an organic ammonium ion) is chemically bonded to the pigment particle surface by a treating agent containing sulfur, that is, a pigment which is dispersed in a solvent having no active protons, no reactivity with a sulfonic acid, and in which the pigment is insoluble or hardly soluble, then is surface-treated such that —$SO_3M$ and/or —$RSO_3M$ is chemically bonded to the particle surface by an amidosulfuric acid or a complex of sulfur trioxide and a tertiary amine, and thus can be dispersed and/or dissolved in water.

As a surface treatment unit that grafts the functional group or the salt thereof on the surface of the pigment particle directly or via a polyvalent group, various known surface treatment units can be applied. Examples thereof include a unit that causes ozone or a sodium hypochlorite solution to act on commercially available oxidized carbon black, and further oxidizes the carbon black so as to treat the surface more hydrophilic (for example, JP-A-7-258578, JP-A-8-3498, JP-A-10-120958, JP-A-10-195331, JP-A-10-237349), a unit that treats carbon black with 3-amino-N-alkyl substituted pyridium bromide (for example, JP-A-10-195360 and JP-A-10-330665), a unit for dispersing an organic pigment in a solvent in which the organic pigment is insoluble or poorly soluble and introducing a sulfone group into the pigment particle surface with a sulfonating agent (for example, JP-A-8-283596, JP-A-10-110110, and JP-A-10-110111), and a unit for dispersing an organic pigment in a basic solvent which forms a complex with sulfur trioxide, treating the surface of the organic pigment by adding sulfur trioxide, and introducing a sulfone group or sulfonamino group (for example, JP-A-10-110114); however, units for preparing the surface treated pigment used in the present invention is not limited thereto.

The functional group to be grafted to one pigment particle may be single or plural. The kind and degree of the grafted functional group may be appropriately determined in consideration of dispersion stability in the ink, color density, dryability on the front surface of the ink jet head, and the like.

The method of dispersing the resin dispersed pigment, the surfactant dispersed pigment, and the surface treated pigment in water can be performed by adding a pigment, water, and a resin dispersant as the resin dispersed pigment, adding a pigment, water, and a surfactant as the surfactant dispersed pigment, adding a surface treated pigment and water as the surface treated pigment, and adding a water-soluble organic solvent or a neutralizing agent to each of the pigments as necessary, with a conventionally used dispersing machine such as a ball mill, a sand mill, an attritor mill, a roll mill, an agitator mill, a Henschel mixer, a colloid mill, an ultrasonic homogenizer, and a jet mill. In this case, regarding a particle diameter of the pigment, the pigment is dispersed until an average particle diameter becomes preferably in a range of 20 nm to 500 nm, and preferably in a range of 50 nm to 200 nm from the viewpoint of securing the dispersion stability in water of the pigment.

1.2.2. Resin Component

In the embodiment, the ink composition contains a water-soluble and/or a water-insoluble resin component. The resin component has a function of solidifying ink and firmly fixing the ink solidified on the recording medium. The resin component may be in either dissolved state in the ink composition or dispersed in the ink composition. As the resin component in the dissolved state, the above resin dispersant, which is used for dispersing the pigment as the coloring material of the ink composition used in the embodiment, can be used. As the resin in the dispersed state, a resin component, which is hardly soluble or insoluble in a liquid medium of the ink composition used in the embodiment is dispersed (that is, in an emulsion state or a suspension state) in the form of fine particles, can be used.

Examples of the above-described resin component include, in addition to the resin used as the above-described resin dispersant, polyacrylic acid ester or a copolymer thereof, polymethacrylic acid ester or a copolymer thereof, polyacrylonitrile or a copolymer thereof, polycyanoacrylate, polyacrylamide, polyacrylic acid, polymethacrylic acid, polyethylene, polypropylene, polybutene, polyisobutylene, polystyrene or a copolymer thereof, a petroleum resin, a chroman indene resin, a terpene resin, polyvinyl acetate or a copolymer thereof; polyvinyl alcohol, polyvinyl acetal, polyvinyl ether, polyvinyl chloride, or a copolymer thereof, polyvinylidene chloride, fluororesin, fluororubber, polyvinylcarbazole, polyvinylpyrrolidone or a copolymer thereof, polyvinyl pyridine, polyvinyl imidazole, polybutadiene or a copolymer thereof, polychloroprene, polyisoprene, and a natural resin. Among them, those having both a hydrophobic portion and a hydrophilic portion in the molecular structure are particularly preferable.

In order to obtain the above-mentioned resin component in a fine particle state, the following method can be used. Any of these methods may be used, and a plurality of methods may be combined as necessary. Examples of the method include a method of mixing a polymerization catalyst (a polymerization initiator) and a dispersant in a monomer constituting a desired resin component, and polymerizing (that is, emulsion polymerization), a method of dissolving a resin component having a hydrophilic portion in a water-soluble organic solvent, then mixing the solution in water, and then removing the water-soluble organic solvent by distillation or the like, and a method of dissolving a resin component in a water-insoluble organic solvent, and mixing the solution with an dispersant in an aqueous solution. The above methods can be appropriately selected depending on the kind and properties of the resin component to be used. The dispersant that can be used for dispersing the resin component is not particularly limited, and examples thereof include an anionic surfactant (for example, dodecylbenzene sulfonic acid sodium salt, lauryl phosphate sodium salt, and polyoxyethylene alkyl ether sulfate ammonium salt), a nonionic surfactant (for example, polyoxyethylene alkyl ether, polyoxyethylene alkyl ester, polyoxyethylene sorbitan fatty acid ester, and polyoxyethylene alkyl phenyl ether). These can be used alone or two or more kinds thereof can be used in combination.

In a case where the above-described resin component is used in a fine particle state (an emulsion form and a suspension form), it is also possible to use those obtained by known materials and methods. For example, the resin components disclosed in JP-B-62-1426, JP-A-3-56573, JP-A-3-79678, JP-A-3-160068, and JP-A-4-18462 may be used. In addition, examples of commercially available product thereof include Micro Gel E-1002 and Micro Gel E-5002 (product name, prepared by Nippon Paint Co., Ltd.), Boncoat 4001 and Boncoat 5454 (product name, prepared by DIC Corporation), SAE1014 (product name, prepared by ZEON Corporation), Saibinol SK-200 (product name, prepared by Saiden Chemical Industry Co., Ltd.), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (product name, prepared by BASF JAPAN LTD).

In a case where the resin component is used in the fine particle state, from the viewpoint of securing the storage stability and the discharge stability of the ink composition, the average particle diameter is preferably in a range of 5 nm to 400 nm, is further preferably in a range of 50 nm to 200 nm. When the average particle diameter of the resin fine particles is within the above-described range, the film formability becomes excellent, and large agglomerates are difficult to form even the resin fine particles agglomerate, and thus the nozzle clogging can be reduced. The average particle diameter in this specification is on a volume basis unless otherwise specified. As a measuring method, for example, it can be measured by a particle size distribution measuring apparatus using dynamic light scattering theory as a measurement principle. Examples of such a particle size distribution measuring apparatus include "Microtrack UPA" manufactured by Nikkiso Co., Ltd.

A glass transition temperature (Tg) of the resin is preferably, for example, in a range of −20° C. to 100° C., and is further preferably in a range of −10° C. to 80° C.

The content of the resin component is preferably, in terms of the solid content, in a range of 0.1% by mass to 15% by mass, is further preferably in a range of 0.5% by mass to 10% by mass, is still preferably in a range of 2% by mass to 7% by mass, and is particularly preferably in a range of 3% by mass to 5% by mass, with respect to the total mass of the ink composition. When the content is within the above range, it is possible to solidify and fix the ink composition even on the recording medium having low or non-ink absorbability.

1.2.3. Organic Solvent

In the embodiment, the ink composition contains an organic solvent. By containing the organic solvent in the ink composition, the dryability of the ink composition discharged onto the recording medium becomes better, and an image excellent in abrasion resistance can be obtained.

The organic solvent used for the ink composition is preferably a water-soluble organic solvent. By using the water-soluble organic solvent, the ink composition has better dryability and an image excellent in the abrasion resistance can be obtained.

The water-soluble organic solvent is not particularly limited, and examples thereof include alcohols such as methanol, ethanol and isopropyl alcohol; ketones or ketoalcohols such as acetone and diacetone alcohol; ethers such as tetrahydrofuran and dioxane; glycols such as hexane diol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether and diethylene glycol monobutyl ether; amines having a hydroxyl group such as diethanolamine and triethanolamine; a nitrogen-containing solvent such as 2-pyrrolidone and N-methylpyrrolidone; and glycerin. Among them, from the viewpoint of improving the dryability of the water-based ink composition, propylene glycol, 1,2-hexanediol, and 1,3-butanediol are preferably used.

The content of the water-soluble organic solvent is preferably in a range of 5.0% by mass to 40% by mass, is further preferably in a range of 10% by mass to 35% by mass, and is particularly preferably in a range of 15% by mass to 30% by mass, with respect to the total mass of the water-based ink composition.

Further, in the embodiment, as the organic solvent used for the ink composition, a nitrogen-containing solvent is exemplified from the viewpoint of obtaining a recorded material excellent in abrasion resistance. Specific examples of the nitrogen-containing solvent include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The nitrogen-containing solvent acts as a dissolving agent good for a thermoplastic resin.

The content of the nitrogen-containing solvent is not particularly limited as long as the content of the nitrogen-containing solvent is less than the content of the nitrogen-containing solvent in the treating liquid described below, and is preferably in a range of 1.0% by mass to 23% by mass, is further preferably in a range of 5.0% by mass to 20% by mass, and is particularly preferably in a range of 10% by mass to 17% by mass, with respect to the total mass of the water-based ink composition. When the content of the nitrogen-containing solvent is within the above range, in a case of using the ink jet recording method according to the embodiment, it is possible to obtain a recorded material excellent in the abrasion resistance, and since the content of the nitrogen-containing solvent in the ink composition is less than the content of the nitrogen-containing solvent in the treating liquid, it is possible to suppress the solubility of the resin contained in the ink in the ink jet head, and thereby it is possible to provide an ink jet recording method excellent in the discharge stability by preventing the clogging of the ink jet head and nozzle. Also, when the ink composition contains the nitrogen-containing solvent, components such as the resin contained in the ink are present in the vicinity due to the nitrogen-containing solvent concentrated when being attached and dried on the recording medium, and thus the components can be rapidly dissolved so as to improve the fixability with respect to the recording medium.

Note that, the organic solvent having a boiling point of equal to or higher than 280° C. may absorb the moisture of the ink composition and thicken the ink composition in the vicinity of the ink jet head, which may lower the discharge stability of the ink jet head. For this reason, in the embodiment, in the ink composition, the content of the organic solvent having the standard boiling point of equal to or higher than 280° C. is preferably equal to or less than 3% by mass, is further preferably equal to or less than 2% by mass, is still further preferably equal to or less than 1% by mass, and is particularly preferably equal to or less than 0.5% by mass. In this case, the dryability of the ink composition on the recording medium is improved, it is possible to form an excellent image in which occurrence of bleeding is suppressed. In addition, stickiness of the obtained recorded material is reduced, and the abrasion resistance becomes excellent.

Examples of the organic solvent having a boiling point of equal to or higher than 280° C. include glycerin. Since the glycerin has high hygroscopicity and high boiling point, clogging of the head and malfunction may be caused in some cases. In addition, the glycerin is lack of the antiseptic properties, is likely to cause fungi and fungi to propagate, and thus is preferably not to be included in the ink composition.

Note that, the organic solvent is preferably an organic solvent having low permeability with respect to the recording medium as compared with the nitrogen-containing solvent. In this case, an image excellent in the abrasion resistance can be formed, and an ink jet recording method excellent in the ink discharge stability can be provided.

The penetration rate of the organic solvent can be obtained by assuming a vinyl chloride recording medium, for example, as a measure of permeability of the organic solvent to the recording medium, and confirming the solubility and swellability with respect to the vinyl chloride resin. As such a method, various known methods can be applied, and can be confirmed by, for example, a method described in Japanese Patent No. 5,204,508. For example when comparing a case where 0.2 g of powder of a vinyl chloride resin is put into 20 mL of solvent, and is stirred for one hour at 25° C., to a case where the same operation is performed except that a solvent is set as 2-pyrrolidone, it is possible to determine that the solvent of the case in which the amount of the resin remaining without being dissolved is large has the permeability lower than that of the nitrogen-containing solvent. Alternatively, in the case where the amount of the resin remaining without being dissolved is almost the same, it is possible to determine that the solvent having higher turbidity has the permeability lower than that of the nitrogen-containing solvent.

1.2.4. Water

In the embodiment, the ink composition contains water. Water is a main medium of the ink composition and is a component that evaporates and scatters by drying. Water is preferably obtained by removing ionic impurities such as pure water of ion-exchanged water, ultrafiltered water, reverse osmosis water, and distilled water, or ultrapure water as much as possible. When water sterilized by ultraviolet irradiation or addition of hydrogen peroxide is used, the generation of mold and bacteria can be suppressed in a case where the ink composition is stored for a long time, which is preferable.

The content of water is preferably equal to or greater than 40% by mass, is further preferably equal to or greater than 50% by mass, is still further preferably equal to or greater than 60% by mass, and is particularly preferably equal to or greater than 70% by mass, with respect to the total mass of the water-based ink composition.

1.2.5. Surfactant

In the embodiment, the ink composition preferably contains a surfactant. The surfactant is not particularly limited, and examples thereof include an acetylene glycol surfactant, a fluorine surfactant, and a silicone surfactant. Among them, at least one thereof is preferably contained in the ink composition.

As the acetylene glycol surfactant is not particularly limited, one or more kinds selected from an alkylene oxide adduct of 2,4,7,9-tetramethyl-5-decyne-4,7-diol and 2,4,7,9-tetramethyl-5-decyne-4,7-diol, and an alkylene oxide adduct of 2,4-dimethyl-5-decyn-4-ol and 2,4-dimethyl-5-decyn-4-ol are preferable. Commercially available products of the acetylene glycol surfactant are not particularly limited, and examples thereof include OLFINE 104 series and OLFINE E series such as OLFINE E1010 (product names, prepared by Air Products and Chemicals Inc.) and SURFYNOL 465 and SURFYNOL 61 and SURFYNOL DF 110D (product names, prepared by Nissin Chemical Industry Co., Ltd). The acetylene glycol surfactant may be used alone or two or more kinds thereof may be used in combination.

The fluorine surfactant is not particularly limited, and examples thereof include perfluoroalkyl sulfonate, perfluoroalkyl carboxylate, perfluoroalkyl phosphate ester, a perfluoroalkyl ethylene oxide adduct, perfluoroalkyl betaine, and a perfluoroalkylamine oxide compound. Commercially available products of the fluorine surfactant are not particularly limited, and examples thereof include SURFLON S144 and S145 (product name, prepared by AGC SEIMI CHEMICAL CO., LTD.); FC-170C, FC-430, and FLUORAD FC 4430 (product name, prepared by Sumitomo 3M Ltd.); FSO, FSO-100, FSN, FSN-100, and FS-300 (product name, prepared by Dupont); and FT-250, and 251 (product name, prepared by Neos Corporation). The fluorine surfactant may be used alone or two or more kinds thereof may be used in combination.

The silicone surfactant is not particularly limited, and examples thereof include a polysiloxane compound and polyether-modified organosiloxane. Commercially available products of the silicone surfactant are not particularly limited, and specific examples include BYK-306, BYK-307, BYK-333, BYK-341, BYK-345, BYK-346, BYK-347, BYK-348, and BYK-349 (which are product names, prepared by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are product names, prepared by Shin-Etsu Chemical Co., Ltd).

Among them, with an acetylene glycol surfactant, it is possible to further improve recoverability of nozzle clogging. On the other hand, a fluorine surfactant and a silicone surfactant have a function of spreading uniformly so as not to cause density irregularities and bleeding of the ink on the recording medium, and thus are preferably used. Accordingly, in the embodiment, the water-based ink composition further preferably contains at least one of the silicone surfactant and the fluorine surfactant, and the acetylene glycol surfactant.

The lower limit of the acetylene glycol surfactant is preferably equal to or greater than 0.1% by mass, is further preferably equal to or greater than 0.3% by mass, and is particularly preferably equal to or greater than 0.5% by mass, with respect to the total mass of the water-based ink composition. On the other hand, the upper limit of the content is preferably equal to or less than 5% by mass, is further preferably equal to or less than 3% by mass, and is particularly preferably equal to or less than 2% by mass. When the content of the acetylene glycol surfactant is within the above range, an effect of improving the nozzle clogging recoverability can be easily obtained.

The lower limit of the content of the fluorine surfactant and the silicone surfactant is preferably equal to or greater than 0.5% by mass, and is further preferably equal to or greater than 0.8% by mass. On the other hand, the upper limit of the content is preferably equal to or less than 5% by mass, and is further preferably equal to or less than 3% by mass. When the content of the fluorine surfactant and the silicone surfactant is within the above range, the fluorine surfactant and the silicone surfactant have a function of spreading uniformly so as not to cause density irregularities and bleeding of the ink on the recording medium, and thus are preferably used.

1.2.6. Other Components to be Contained

In the embodiment, the ink composition may further contain a pH adjusting agent, a polyolefin wax, an antiseptic or mildewproofing agent, a rust preventive agent, a chelating agent, and the like. When these materials are added, it is possible to further improve the properties of the ink composition.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Examples of the polyolefin waxes include waxes and copolymers thereof prepared from olefins such as ethylene, propylene, and butylene, and specific examples thereof include polyethylene wax, polypropylene wax, polybutylene wax, and the like. As the polyolefin wax, commercially available polyolefin wax can be used, and specifically, NOPCOAT PEM 17 (product name, prepared by San Nopco Limited Ltd.), CHEMIPEARL W4005 (product name, prepared by Mitsui Chemicals, Inc.), and AQUACER 515, AQUACER 593 (product name, prepared by BYK Japan KK).

Adding the polyolefin wax is preferable from the viewpoint of improving the slipping property with respect to the physical contact of the image formed on the recording medium having non-ink absorbability or ink low absorbability, and improving the abrasion resistance of the image. The content of the polyolefin wax is preferably in a range of 0.01% by mass to 10% by mass, and is further preferably in a range of 0.05% by mass to 1% by mass, with respect to the total mass of the ink composition. When the content of the polyolefin wax is within the above range, the above-described effects are sufficiently exhibited.

Examples of the antiseptic or mildewproofing agent include sodium benzoate, sodium pentachlorophenol, sodium 2-pyridinethiol-1-oxide, sodium sorbate, sodium dehydroacetate, and 1,2-dibenzisothiazolin-3-one. As a commercially available product, Proxel XL2 and Proxel GXL (product name, prepared by Avecia) and, Denicide CSA and NS-500W (product names, prepared Nagase Kem made Tex Co., Ltd).

Examples of the rust preventive include benzotriazole.

Examples of the chelating agent include an ethylenediaminetetraacetic acid and salts thereof (such as ethylenediaminetetraacetic acid dihydrogen disodium salt).

1.2.7. Method of Preparing of Ink Composition

The ink used in the embodiment can be obtained by mixing the above-mentioned components in an arbitrary order, and filtering or the like as necessary so as to remove impurities. As a method of mixing the respective components, a method in which materials are sequentially added into a container equipped with a stirring device such as a mechanical stirrer and a magnetic stirrer, and stirring and mixing the materials is suitably used. As a filtration method, centrifugal filtration, filter filtration, and the like can be performed as necessary.

1.2.8. Physical Properties of Ink Composition

In the ink composition used in the embodiment, a surface tension at 20° C. is preferably in a range of 20 mN/m to 40 mN/m, and is further preferably in a range of 20 mN/m to 35 mN/m from the viewpoint of balance between the image quality and reliability as ink for ink jet recording. Note that, the measurement of the surface tension can be performed, for example, by confirming the surface tension when a platinum plate is wetted with ink in an environment of 20° C. using an automatic surface tensiometer CBVP-Z (product name, manufactured by Kyowa Interface Science Co., Ltd).

In addition, from the same viewpoint, the viscosity at 20° C. of the ink composition used in the embodiment is preferably in a range of 3 mPa·s to 10 mPa·s, and is further preferably in a range of 3 mPa·s to 8 mPa·s. Note that, the measurement of the viscosity can be performed by measuring the viscosity in an environment of 20° C. using a viscoelasticity testing machine MCR-300 (manufactured by Pysica, Inc).

1.3. Treating Liquid

Next, the treating liquid used in the recording method described later will be described. The treating liquid used in the embodiment contains a nitrogen-containing solvent, and the content of the nitrogen-containing solvent is higher than that of the ink composition. Hereinafter, the components contained in the treating liquid used in the embodiment and the components that can be contained will be described in detail.

Note that, in the embodiment, the treating liquid, in which the content of the coloring material is equal to or less than 0.2% by mass, is not the ink composition used for coloring the recording medium, but is an auxiliary liquid used to be attached to the recording medium before the ink composition is attached to the recording medium.

1.3.1. Nitrogen-Containing Solvent

The treating liquid used in the embodiment contains a nitrogen-containing solvent as an organic solvent, and the content of the nitrogen-containing solvent is greater than the ink composition. In addition, when the treating liquid in which the content of the nitrogen-containing solvent is greater than the ink composition is attached to the recording medium, it is possible to secure the solubility of the resin of the ink in the convex portion of the recording medium and to record an image excellent in the abrasion resistance. Further, before performing the ink attaching step on the recording medium on which a treating liquid attaching step is performed, the surface of the recording medium can be swelled and dissolved by the nitrogen-containing solvent contained in the treating liquid, and when the solid content of the resin or the like contained in the ink composition is fixed to the recording medium, it is possible to obtain a recorded material which is excellent in the abrasion resistance.

The content of the nitrogen-containing solvent in the treating liquid is not particularly limited as long as the content of the nitrogen-containing solvent is greater than the ink composition, and is preferably in a range of 3% by mass to 25% by mass, is further preferably in a range of 5% by mass to 20% by mass, and is still further preferably in a range of 7% by mass to 15% by mass, with respect to the total mass of the treating liquid. When the content of the nitrogen-containing solvent in the treating liquid is within the above range, an image excellent in the abrasion resistance can be formed, and an ink jet recording method excellent in the ink discharge stability can be provided.

In addition, the content of the nitrogen-containing solvent in the treating liquid is preferably equal to or greater than 3% by mass, is further preferably equal to or greater than 5% by mass, is still further preferably equal to or greater than 7% by mass, and is particularly preferably equal to or greater than 10% by mass as compared with the content of the nitrogen-containing solvent in the ink composition. Although it is not limited, the content of the nitrogen-containing solvent in the treating liquid is preferably greater than the content of the nitrogen-containing solvent in the ink composition by equal to or less than 20% by mass. From the above-described viewpoint, it is preferable that the difference between the content of the nitrogen-containing solvent in the treating liquid and the content of the nitrogen-containing solvent in the ink composition be within the above range.

1.3.2. Organic Solvent

The treating liquid used in the embodiment preferably contains an organic solvent other than the nitrogen-containing solvent. When the treating liquid contains an organic solvent, it is possible to improve the wettability of the treating liquid to the recording medium. As an organic solvent, the same organic solvents as those exemplified for the ink composition can be used. The content of the organic solvent is not particularly limited, and it is preferably in a range of 1% by mass to 40% by mass and is preferably in a range of 5% by mass to 30% by mass with respect to the total mass of the treating liquid.

Note that, similar to the above-described ink, in the treating liquid, as the organic solvent, the content of the organic solvent having a standard boiling point of equal to or higher than 280° C. is preferably equal to or less than 3% by mass, is further preferably equal to or less than 1% by mass, and is further preferably equal to or less than 0.5% by mass. In this case, the dryability of the treating liquid is excellent, and thus the drying of the treating liquid is rapidly performed. Also, the stickiness of the recorded material obtained by a recording method described below is reduced, and the abrasion resistance becomes excellent. Examples of the organic solvent having a boiling point of equal to or higher than 280° C. include glycerin.

Note that, as the organic solvent, an organic solvent preferably has low permeability with respect to the recording medium as compared with the nitrogen-containing solvent. In this case, an image which is more excellent in the abrasion resistance can be formed, and an ink jet recording method excellent in the ink discharge stability can be provided.

1.3.3. Aggregating Agent

The treating liquid may include an aggregating agent that aggregates components of the ink composition. When the treating liquid contains the aggregating agent for aggregating the components of the ink composition, the aggregating agent and the resin contained in the ink composition rapidly respond in the recording method described below. With this, a dispersion state of the coloring material and the resin in the ink composition is destroyed, and the coloring material and the resin aggregate. Since this agglutination inhibits penetration of the coloring material into the recording medium, it is possible to improve the image quality of the formed image.

Examples of the aggregating agent include a polyvalent metal salt, a cationic compound (a cationic resin, a cationic surfactant, and the like), and an organic acid. These aggregating agents may be used alone or two or more kinds thereof may be used in combination. Among these aggregating agents, it is preferable to use at least one aggregating agent selected from the group consisting of a polyvalent metal salt and an organic acid from the viewpoint of excellent reactivity with the resin contained in the ink composition.

The polyvalent metal salt is a compound that is composed of a polyvalent metal ion having two or more valences and an anion binding to these polyvalent metal ions and is soluble in water. Specific examples of the polyvalent metal ion include a divalent metal ion such as $Ca^{2+}$, $Cu^{2+}$, $Ni^{2+}$, $Mg^{2+}$, $Zn^{2+}$, and $Ba^{2+}$; $Al^{3+}$, $Fe^{3+}$, and a trivalent metal ion such as $Cr^{3+}$. Examples of the anion include $Cl^-$, $I^-$, $Br^-$, $SO_4^{2-}$, $ClO^{3-}$, $NO^{3-}$, $HCOO^-$, and $CH_3COO^-$. Among these polyvalent metal salts, a calcium salt and a magnesium salt are preferable from the viewpoint of the stability of the treating liquid and the reactivity as an aggregating agent.

Preferable examples of the organic acid include a sulfuric acid, a hydrochloric acid, a nitric acid, a phosphoric acid, a polyacrylic acid, an acetic acid, a glycolic acid, a malonic acid, a malic acid, a maleic acid, an ascorbic acid, a succinic acid, a glutaric acid, a fumaric acid, a citric acid, a tartaric acid, a lactic acid, a sulfonic acid, an orthophosphoric acid, a pyrrolidone carboxylic acid, a pyrone carboxylic acid, a pyrrole carboxylic acid, a furancarboxylic acid, a pyridine carboxylic acid, a coumaric acid, an thiophencarboxylic acid, a nicotinic acid, and derivatives of these compounds, or salts thereof. The organic acid may be used alone or two or more kinds thereof may be used in combination.

Examples of the cationic resin include a cationic urethane resin, a cationic olefin resin, and a cationic allylamine resin.

As the cationic urethane resin, known ones can be appropriately selected and used. As the cationic urethane resin, a commercially available product can be used, and examples thereof include HYDRAN CP-7010, CP-7020, CP-7030, CP-7040, CP-7050, CP-7060, and CP-7610 (product name, prepared by DIC Corporation), SUPER FLEXs 600, 610, 620, 630, 640, and 650 (product name, prepared by DAI-ICHI KOGYO SEIYAKU Co., Ltd.), and urethane emulsion WBR-2120C and WBR-2122C (product name, prepared by TAISEI FINE CHEMICAL Co., Ltd).

The cationic olefin resin has olefin such as ethylene and propylene as a structural skeleton, and the well-known resins can be appropriately selected to be used. Also, the cationic olefin resin may be an emulsion which is dispersed in a solvent including water or an organic solvent. As the cationic olefin resin, commercially available products can be used, and the examples thereof include Arrowbase CB-1200 and CD-1200 (product name, prepared by UNITIKA Ltd).

As the cationic allylamine-based resin, the well-known resins can be appropriately selected to be used, and the examples thereof include poly allylamine hydrochloride, poly allylamine amide sulfate, an allylamine hydrochloride.diallylamine hydrochloride copolymer, an allylamine acetate.diallylamine acetate copolymer, an allylamine acetate.diallylamine acetate copolymer, an allylamine hydrochloride.dimethyl allylamine hydrochloride copolymer, an allylamine.dimethyl allylamine copolymer, polydiallylamine hydrochloride, polymethyl diallylamine hydrochloride, polymethyl diallylamine amide sulfate, polymethyl diallylamine acetate, polydiallyl dimethyl ammonium chloride, a diallylamine acetate.sulfur dioxide copolymer, a diallyl methylethyl ammonium ethyl sulfate.sulfur dioxide copolymer, a methyldiallylamine hydrochloride.sulfur dioxide copolymer, a diallyldimethyl ammonium chloride.sulfur dioxide copolymer, and a diallyldimethyl ammonium chloride.acrylamide copolymer. As the cationic allylamine-based resin, commercially available products can be used, and the examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (product name, prepared by NITTOBO MEDICAL CO., LTD.), HYMO Neo-600, HYMOLOC Q-101, Q-311, and Q-501, HIMAX SC-505, and SC-505 (product name, prepared by HYMO Co., Ltd).

Examples of the cationic surfactant include primary, secondary, and tertiary amine salt-type compounds, an alkylamine salt, a dialkylamine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. The specific examples thereof include hydrochlorides or acetates of laurylamine, coconut-type amine, rosin amine, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridiniumbromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

The aggregating agent may have a solubility in water of equal to or less than 600 g/L. In the embodiment, maintenance of the ink jet head is performed using a maintenance liquid which will be described below. Therefore, even in a case where the solubility in water is low and the aggregating agent tends to precipitate due to the drying of the nozzle surface, it is possible to eliminate discharge failure on the nozzle surface due to treating liquid. Even when the solubility in water is equal to or less than 500 g/L, the effect of the invention is obtained, and even when the solubility in water is equal to or less than 400 g/L, and is equal to or less than 300 g/L, the effect of the invention is obtained.

The concentration of the aggregating agent in the treating liquid may be equal to or greater than 0.03 mol/kg in 1 kg of treating liquid. In addition, in 1 kg of treating liquid, the concentration of the aggregating agent may be in a range of 0.1 mol/kg to 1.5 mol/kg, and may be in a range of 0.2 mol/kg to 0.9 mol/kg. In addition, the content of the aggregating agent is, for example, preferably in a range of 0.1% by mass to 25% by mass, is further preferably in a range of 0.2% by mass to 20% by mass, is still further preferably in a range of 0.3% by mass to 10% by mass, is particularly preferably in a range of 0.5% by mass to 8% by mass, is further particularly preferably in a range of 1% by mass to 7% by mass, with respect to the total mass of the treating liquid.

Note that, the confirmation that the aggregating agent reacts with the resin contained in the ink composition can be performed depending on whether or not the resin aggregates in a "test for aggregation properties of resin". The "test for aggregation properties of resin" is performed, for example, by mixing and agitating an aggregating agent solution, which is adjusted to have a predetermined concentration, into a resin solution containing a predetermined concentration of resin, and visually checking whether or not a precipitate has occurred in the mixture.

1.3.4. Water

Water preferably functions as a main medium of the treating liquid used in the embodiment. The water is a component that is evaporated and dispersed by drying after attaching the treating liquid to the recording medium. As the water, pure water such as ion exchanged water, ultrafiltrated water, reverse osmotic water, and distilled water, or water from which ionic impurities are completely removed such as ultrapure water is preferable. In addition, when water sterilized by irradiation with ultraviolet rays or addition of hydrogen peroxide is used, it is possible to prevent generation of fungi or bacteria in a case where the treating liquid is stored for a long period of time, which is preferable. The content of the water contained in the treating liquid can be equal to or greater than 40% by mass, is preferably equal to or greater than 50% by mass, is further preferably equal to or greater than 55% by mass, and is still further preferably equal to or greater than 65% by mass, with respect to the total mass of the treating liquid.

1.3.5. Surfactant

The treating liquid used in the embodiment may add a surfactant. By adding the surfactant, it is possible to improve the wettability with respect to the recording medium by decreasing the surface tension of the treating liquid. Among the surfactants, for example, an acetylene glycol-based surfactant, a silicone-based surfactant, and a fluorine-based surfactant may be preferably used. As specific examples of these surfactants, the same surfactant as exemplified in the ink composition described later can be used. The content of the surfactant is not particularly limited, and can be set to be in a range of 0.1% by mass to 1.5% by mass with respect to the total mass of the treating liquid.

1.3.6. Other Components

The treating liquid used in the embodiment, as necessary, may contain a pH adjuster, an antiseptic or mildewproofing agent, a rust preventive, a chelating agent, and the like.

1.3.7. Preparing Method of Treating Liquid

The treating liquid used in the embodiment can be prepared by dispersing and mixing the above-described components using an appropriate method. After thoroughly stirring each of the above components, filtration is performed in order to remove coarse particles and foreign matters which cause clogging, and thereby a desired treating liquid can be obtained.

1.3.8. Physical Properties of Treating Liquid

In a case where the treating liquid used in the embodiment is discharged by using an ink jet recording head, the surface tension at a temperature of 20° C. is preferably in a range of 20 mN/m to 40 mN/m, and is further preferably in a range of 20 mN/m to 35 mN/m. The surface tension can be measured by for example, confirming the surface tension when a platinum plate is wetted by the treating liquid in an environment of 20° C., using an automatic surface tensiometer CBVP-Z (product name, manufactured by Kyowa Interface Science Co., Ltd).

In addition, from the same viewpoint, the viscosity of the treating liquid used in the embodiment at a temperature of 20° C. is preferably in a range of 3 mPa·s to 10 mPa·s, and is further preferably in a range of 3 mPa·s to 8 mPa·s. Note that, the viscosity can be measured in an environment of 20° C., for example, using a viscoelastic testing machine MCR-300 (product name, manufactured by Psica).

1.4. Recording Medium

The ink composition used in the embodiment has ink dryability, and is attached to the recording medium before the treating liquid in which the content of the nitrogen-containing solvent is larger than ink composition is attached to the ink composition, and thus can be preferably used to perform printing on a recording medium having non-ink absorbability or low ink absorbability having a step of surface unevenness which is equal to or greater than 10 μm.

Examples of the recording medium having non-ink absorbability include a medium to which a plastic film which is not subjected to a surface treatment for ink jet printing (that is, no ink absorbing layer is formed), a medium to which plastic is coated on a base material such as paper, and a medium to which a plastic film is bonded. Examples of the plastic herein include polyvinyl chloride, polyethylene terephthalate, polycarbonate, polystyrene, polyurethane, polyethylene, and polypropylene. Examples of the recording medium having low absorbability include printing paper such as art paper, coated paper, and mat paper. Note that, in the present specification, the recording medium having non-ink absorbability or low ink absorbability is also simply referred to as "plastic media".

Here, in the present specification, the "recording medium having non-ink absorbability or ink low absorbability" means "recording medium of which the water absorption amount is equal to or less than 10 $mL/m^2$ within 30 $msec^{1/2}$ from the start of contacting a liquid according to Bristow method". The Bristow method is most widely used as a method for measuring the liquid absorption amount in a short period of time, and has been adopted by Japan Technical Association of the Pulp and Paper Industry (Japan TAPPI). The details of the testing method is described in the standard No. 51 "Paper and Paperboard-liquid absorbability testing method-Bristow method" of the "JAPAN TAPPI paper and pulp testing method 2000 version".

Examples of the recording medium having non-absorbability include a medium in which a base material having no ink receiving layer such as a resinous plastic film, a plastic sheet, a plastic plate, and a paper is coated with a plastic, and a medium on which a plastic film is attached. Examples of the plastic herein include polyvinyl chloride, polyethylene terephthalate, polycarbonate, polystyrene, polyurethane, polyethylene, and polypropylene, and modified products, copolymers, and blended products thereof. The recording medium made of a resin may be any recording medium of which the surface on the recording surface of the recording medium is made of the above-mentioned resin.

Examples of the recording medium having low absorbability include a recording medium provided with a coating layer for receiving an ink on the surface thereof. As the paper base material, for example, printing paper such as art paper, coated paper, and mat paper can be exemplified. In a case where the base material is a plastic film, the examples thereof include a film of which the surface such as polyvinyl chloride, polyethylene terephthalate, polycarbonate, polystyrene, polyurethane, polyethylene, and polypropylene is coated with a hydrophilic polymer, and a film coated with particles such as silica and titanium, and a binder. These recording media may be transparent recording media.

Further, as a recording medium having non-ink absorbability or low ink absorbability in which the step of the surface unevenness is equal to or greater than 10 μm, a resin recording medium with unevenness on the surface such as what is called an embossed medium and tarpaulin, but is not limited thereto. Examples thereof include a resin recording medium which has uneven tone texture on the surface. In a case of using the recording medium described above, a unique texture can be produced, for example, it is preferable as a recording medium excellent in wallpaper and design.

Also, the step of surface unevenness can be measured by, for example, observing the section of the recording medium with a field emission scanning electron microscope, measuring a difference between the highest and lowest place on the surface in the observed field of view, changing the observation field of view, and then calculating as an average value of 50 places randomly measured in different visual fields.

In the embodiment, when the treating liquid in which the content of the nitrogen-containing solvent is greater than the ink composition is attached to the recording medium before the attachment of the ink composition, it is possible to secure the solubility of the resin of the ink in the convex portion of the recording medium and to record an image excellent in the abrasion resistance, and thus it is possible to record an image excellent in the abrasion resistance even when the step of the surface unevenness of the recording medium may be equal to or greater than 50 μm, may be equal to or greater than 70 μm, may be equal to or greater than 100 μm, and may be equal to or greater than 140 μm. Note that, the step of the surface unevenness of the recording medium is preferably equal to or less than 200 μm from the viewpoint of securing the image quality and the abrasion resistance.

2. INK JET RECORDING METHOD

An ink jet recording method according to the embodiment includes a treating liquid attaching step of attaching a treating liquid, which is used to be attached to a recording medium before an ink composition is attached to the recording medium, and has a content of a nitrogen-containing solvent which is greater than the ink composition, to a recording medium having low or non-absorbability in which a step of the surface unevenness is equal to or greater than 10 μm, and an ink attaching step of attaching the ink composition containing the nitrogen-containing solvent by discharging the ink composition from an ink jet head to a recording medium subjected to the treating liquid attaching step. Hereinafter, description will be made with reference to the drawings.

2.1. Treating Liquid Attaching Step

The treating liquid attaching step is a step of attaching the treating liquid to the recording medium having low or non-absorbability in which a step of the surface unevenness is equal to or greater than 10 μm before the ink composition is attached to the recording medium. When the treating liquid in which the content of the nitrogen-containing solvent is greater than the ink composition is attached to the recording medium before the attachment of the ink composition, it is possible to secure the solubility of the resin of the ink in the convex portion of the recording medium and to record an image excellent in the abrasion resistance.

Before the treating liquid attaching step, it is preferable that the recording medium be heated by the IR heater 3 or the platen heater 4 as illustrated in FIG. 1 by the preheater 7 as illustrated in FIG. 1 or during the treating liquid attaching step. When the treating liquid is attached onto the heated recording medium M, the treating liquid discharged on the recording medium is likely to spread on the recording medium, and can be uniformly applied. For this reason, the treating liquid sufficiently reacts with the ink attached in the ink attaching step described below, and excellent image quality can be obtained. In addition, the treating liquid uniformly applied on the recording medium M, and thus it is possible to reduce a coating amount. For this reason, it is possible to prevent the abrasion resistance of the obtained image from being deteriorated.

Here, a temperature of the surface of the recording medium when the treating liquid is attached to the recording medium M is preferably in a range of 30° C. to 55° C., is further preferably in a range of 35° C. to 50° C., and is still further preferably in a range of 40° C. to 45° C. When the temperature of the treating liquid is within the above range, it is possible to uniformly apply the treating liquid on the recording medium M, and thereby the image quality can be improved. In addition, it is possible to suppress the influence of heat on the ink jet head 2.

The attachment amount of the treating liquid in the treating liquid attaching step is preferably equal to or less than 10 mg/inch$^2$, is further preferably in a range of 0.1 to 10 mg/inch$^2$, is still further preferably in a range of 0.3 to 5 mg/inch$^2$, is particularly preferably in a range of 0.5 to 3 mg/inch$^2$, and is further particularly preferably in a range of 0.7 to 2 mg/inch$^2$. In addition, the maximum attachment amount of the treating liquid in the treating liquid attaching step is preferably in a range of 0.5 to 10 mg/inch$^2$, is further preferably in a range of 0.5 to 5 mg/inch$^2$, is still further preferably in a range of 0.7 to 3 mg/inch$^2$, and is particularly preferably in a range of 0.7 to 2 mg/inch$^2$. When the attachment amount and the maximum attachment amount are within the above range, it is likely to obtain an excellent image quality and the time required for the attaching step can be shortened. With this, an adverse effect on the recorded material due to the excessive amount of the components, other than the nitrogen-containing solvent contained in the treating liquid, attached to the recording medium is prevented, which is preferable.

The attachment amount of the treating liquid in the treating liquid attaching step is an attachment amount of the treating liquid in treating liquid attaching step in an area where the treating liquid attaching step and an ink attaching step of the ink jet recording method are performed, and has an area where at least an attachment amount is the attachment amount in the above area.

In addition, the maximum attachment amount of the treating liquid in the treating liquid attaching step is an attachment amount of the treating liquid in an area where the attachment amount of the treating liquid in the treating liquid attaching step is the maximum, in the area where the treating liquid attaching step and the ink attaching step of the ink jet recording method are performed. Accordingly, in the area where the treating liquid attaching step and the ink attaching step are performed, other areas where the attachment amount is less than the maximum attachment amount.

Further, in the area where the attachment amount of the water-based ink composition is the maximum attachment amount of the water-based ink composition in the area where the treating liquid attaching step and the ink attaching step are performed, the attachment amount of the treating liquid is preferably to be within the above range. In addition, in the area where the treating liquid attaching step and the ink attaching step are performed, from the area where the attachment amount of the water-based ink composition is the maximum attachment amount of the water-based ink composition to an area where the attachment amount is 60% by mass of the maximum attachment amount, the attachment amount of the treating liquid is further preferably to be within the above range.

Note that, the attachment of the treating liquid may be performed by discharge with the ink jet head 2, and other methods, for example, a method of applying the treating liquid with a roll coater or the like, and a method of discharging the treating liquid are exemplified.

2.2. Ink Attaching Step

The ink attaching step is a step of attaching the ink composition containing the nitrogen-containing solvent by discharging the ink composition from an ink jet head to a recording medium subjected to the treating liquid attaching step, and by this step, droplets of the ink composition and the treating liquid react with each other on the recording medium. With this, an image formed of the ink composition is formed on the surface of the recording medium. In addition, since the content of the nitrogen-containing solvent in the treating liquid is greater than the ink composition, it is likely to improve the solubility of the resin contained in the ink so as to easily form a film on the recording medium, and it is possible to improve the fixability of the ink coating film and the abrasion resistance of the image. Further, in a case where the treating liquid contains an aggregating agent, the aggregating agent reacts with the ink components on the recording medium, and thereby it is possible to obtain more excellent image quality.

Here, in the embodiment, the "image" means a recording pattern formed from the group of dots, and examples thereof include text printing and a solid image. In addition, the "solid image" means an image pattern which is an image in which dots of a pixel, which is a minimum recording unit area defined by a recording resolution, are recorded with respect to all pixels, and usually a recording area of the recording medium area is covered with ink so that other parts except for the recording medium area are not seen.

In the embodiment, a heating in the ink attaching step may be performed concurrently with the treating liquid attaching step. Discharging the water-based ink composition through the ink jet method can be performed by using a well-known ink jet recording apparatus. Examples of the discharging method include a piezo method or a method of discharging ink by bubbles generated by heating ink. Among them, a piezo method is preferably used from the viewpoint of hardness of alteration of water-based ink composition.

The maximum attachment amount of the water-based ink composition per unit area of the recording medium is preferably in a range of 5 to 20 mg/inch$^2$, is further preferably in a range of 7 to 15 mg/inch$^2$, and is still further preferably in a range of 8 to 13 mg/inch$^2$. The maximum attachment amount of the water-based ink composition per unit area of the recording medium is preferably within the above range, from the viewpoint of enabling recording of useful images and obtaining excellent image quality.

Further, the surface temperature of the recording medium at the time of attaching ink is preferably equal to or lower than 45° C., is further preferably equal to or lower than 40° C., and is still further preferably equal to or lower than 38° C. The lower limit is not limited, and is preferably equal to or higher than 30° C., is further preferably equal to or higher than 32° C., and is still further preferably equal to or higher than 35° C. When the surface temperature of the recording medium at the time of attaching ink is within the above range, it is possible to suppress the influence of heat on the ink jet head 2 and to prevent the nozzle clogging.

In a case where the ink jet recording apparatus 1 is a serial printer, the time during which the recording medium faces the ink jet head 2 during one main scanning is preferably equal to or shorter than 12 seconds. The upper limit of this time is further preferably equal to or shorter than 10 seconds, and is particularly preferably equal to or shorter than 6 seconds. The lower limit of this time is preferably equal to or longer than 1 second, is further preferably equal to or longer than 2 seconds, and is particularly preferably equal to or longer than 3 seconds. The time during which the recording medium M faces the ink jet head 2 during one main scanning is equal to the time that nozzles which are not used during one main scanning receive heat from recording medium M. In other words, if this time is within the above range, the time that the nozzles which are not used during one main scanning receive heat from the recording medium M is sufficiently short, and thus it is possible to suppress the drying of the water-based ink composition in the nozzle and composition variation thereof in the ink, and it is possible to reduce welding of the resin to an inner wall of the nozzle. As a result, the landing deviation of ink at the time of continuous printing can be suppressed, and the nozzle clogging recoverability is further improved.

2.3. Drying Step

The ink jet recording method according to the embodiment may include a drying step of drying the recording medium to which the water-based ink composition is attached by using the hardening heater 5 as illustrated in FIG. 1, after the ink attaching step. With this, the resin components contained in the water-based ink composition on the recording medium are melted, and thereby a recorded material with good filling properties can be prepared. The drying temperature (primary drying temperature) by the hardening heater 5 is preferably in a range of 40° C. to 120° C., is further preferably in a range of 60° C. to 100° C., and is still further preferably in a range of 80° C. to 90° C. When the drying temperature is within the above range, the abrasion resistance is likely to be more improved. Further, with the cooling fan 6 as illustrated in FIG. 1, the ink composition on the recording medium M may be cooled. In this case, it is possible to form an ink film on the recording medium M with high adhesion.

2.4. Maintenance Step

According to the ink jet recording method according to the embodiment may include a maintenance step of discharging a water-based ink composition and a treating liquid by units other than a pressure generation unit for discharging and recording ink, that is, mechanisms other than a mechanism for discharging ink for recording provided in the ink jet head.

Examples of the mechanism for discharging ink for recording which is provided in the ink jet head include a piezoelectric element for applying pressure to ink provided in a pressure chamber and a heater element. The maintenance step may be a step of discharging the water-based ink composition from the nozzle by applying pressure to the ink jet head from the outside. With this step provided, even in a case where there is a concern that the resin may be welded to the inner wall of the ink jet head, it is possible to suppress the welding of the resin, and thereby it is possible to further improve the clogging properties.

In addition, in the ink jet recording method according to the embodiment, it is preferable to control so as to perform recording for one hour or more without performing the above maintenance step. By controlling in this manner, there is no case where the recording speed is reduced by interrupting the recording along with the aforementioned step, which is preferable. Even in such a case, by using the water-based ink composition described above, the landing deviation of ink at the time of the continuous printing and the clogging of the ink jet head can be suppressed, and a good image without bleeding can be recorded as well.

Here, as another mechanism described above, a mechanism for applying pressure such as application of suction (negative pressure), application of positive pressure from the upstream of the head, and the like can be exemplified. This mechanism is not for ink discharge (such as flushing) using a function of the ink jet head. That is, in the recording, the aforementioned mechanism is not for the ink discharge using a function of discharging the ink from the ink jet head.

Also, the recording time may not be continuous, and it may be paused unless externally applying pressure to the ink jet head and discharging the water-based ink composition from the nozzle. Here, the recording time is a recording time including the pause time between operations of recording. The recording time may be preferably equal to or longer than one hour, is preferably equal to or longer than 1.5 hours, is still further preferably equal to or longer than two hours, and is particularly preferably equal to or longer than three hours. The upper limit of the recording time is not limited, and is preferably equal to or shorter than ten hours, is further preferably equal to or shorter than five hours, and is still further preferably equal to or shorter than four hours.

In addition, in the ink jet recording method according to the embodiment, from the above-described viewpoint, it is preferable not to perform the maintenance step during the recording in one recording. Further, from the above-described viewpoint, it is preferable to perform the maintenance step at least either before recording or after recording.

As described above, in the ink jet recording method according to the embodiment, when the treating liquid in which the content of the nitrogen-containing solvent is greater than the ink composition is attached to the recording medium before the attachment of the ink composition, it is possible to secure the solubility of the resin of the ink in the convex portion of the recording medium and to record an image excellent in the abrasion resistance. In addition, the content of the nitrogen-containing solvent in the ink composition is less than the content of the nitrogen-containing solvent in the treating liquid, and thus it is possible to suppress the solubility of the resin contained in the ink in the ink jet head, and thereby it is possible to provide an ink jet recording method excellent in the discharge stability by preventing the clogging of the ink jet head and nozzle.

Note that, the embodiment may relate to a method of controlling the ink jet recording apparatus. The control method is to perform control such that the ink jet recording method and the maintenance step are performed by the ink jet recording apparatus by a control unit provided in the ink jet recording apparatus.

3. EXAMPLES

Hereinafter, the embodiment of the invention will be further described by showing Examples and Comparative Examples, but the invention is not limited to the following examples.

3.1. Preparation of Ink Composition

Each of the components were mixed and stirred so as to have the blending ratio indicated in Table 1, and thereby ink compositions 1 to 6 (hereinafter, also referred to as "ink treating liquid 1") were obtained. The numerical values indicated in Table 1 all indicate % by mass, pure water was added such that the total mass of the ink composition is 100% by mass.

TABLE 1

| Ink composition | | Standard boiling point (° C.) | Ink 1 | Ink 2 | Ink 3 | Ink 4 | Ink 5 | Ink 6 |
|---|---|---|---|---|---|---|---|---|
| Pigment | PB 15-3 Pigment | | 4% | 4% | 4% | 4% | 4% | 4% |
| Other solvents | 1,2-hexanediol | 224 | 5% | 10% | 10% | 6% | 10% | 10% |
| | 1,3-butanediol | 207 | 5% | 5% | 5% | 4% | 5% | 5% |
| | Glycerin | 290 | — | — | — | 5% | — | — |
| Nitrogen-containing solvent | 2-pyrrolidone | 245 | 10% | 5% | 15% | 15% | 5% | 20% |
| Surfactant | BYK 348 | | 1% | 1% | 1% | 1% | 1% | 1% |
| | DF110D | | 0.50% | 0.50% | 0.50% | 0.50% | 0.50% | 0.50% |
| Resin | Styrene-acrylic resin | | 3% | 3% | 3% | 3% | 3% | 3% |
| Pure water | | | Residue | Residue | Residue | Residue | Residue | Residue |
| Total | | | 100 | 100 | 100 | 100 | 100 | 100 |

The materials used are as follows.

Pigment

PB 15:3 (product name, "CHROMOFINE", C.I. Pigment Blue 15:3, prepared by Dainichiseika Color & Chemicals Mfg. Co., Ltd.)

Surfactant

BYK348 (product name, silicone surfactant, prepared by BYK Additives & Instruments)

DF110D (product name, "SAFYNOL DF110D", acetylene glycol surfactant, prepared by Air Products Limited)

Resin

Styrene acrylic resin (product name "JURYMER", Tg of 76° C., as a solid content, prepared by Toagosei Co., Ltd.)

Although not indicated in Table 1, apart from the above styrene acrylic resin, a pigment dispersant resin is also separately included.

In addition, in Table 1, 1,2-hexanediol, 1,3-butanediol, and glycerin which are used as "other solvents" are organic solvents having low permeability with respect to the recording medium as compared with 2-pyrrolidone used as the nitrogen-containing solvent. The penetration rate of this organic solvent was determined by assuming a vinyl chloride recording medium as a measure of permeability of the organic solvent into the recording medium and confirming the solubility and swelling property with respect to the vinyl chloride resin.

For example, it is possible to confirm by a method described in Japanese Patent No. 5,204,508. Specifically, when comparing a case where 0.2 g of powder of a vinyl chloride resin is put into 20 mL of solvent, and is stirred for one hour at 25° C., to a case where the same operation is performed except that a solvent is set as 2-pyrrolidone, it is determined that the solvent of the case in which the amount of the resin remaining without being dissolved is large has the permeability lower than that of the nitrogen-containing solvent. Alternatively, in the case where the amount of the resin remaining without being dissolved is almost the same, it is determined that the solvent having higher turbidity has the permeability lower than that of the nitrogen-containing solvent. As the vinyl chloride resin used here, a resin of rigid vinyl chloride pipe (VP) for water supply (JIS K 6742 7922 Eslon pipe VP 25 R0007 4261) prescribed in Japanese Industrial Standard JIS K 6742:2004 is used in a powder form.

3.2. Preparation of Treating Liquid

In accordance with the composition indicated in Table 2, the respective components were mixed and stirred, and filtrated with a membrane filter of 10 μm so as to prepare treating liquids 1 to 6. The numerical values indicated in Table 2 all indicate % by mass, pure water was added such that the total mass of the treating liquid is 100% by mass.

TABLE 2

| Treating liquid composition | | Standard boiling point (° C.) | Treating liquid 1 | Treating liquid 2 | Treating liquid 3 | Treating liquid 4 | Treating liquid 5 | Treating liquid 6 |
|---|---|---|---|---|---|---|---|---|
| Aggregating agent | Magnesium sulfate | | 6% | 6% | 6% | — | — | — |
| | Malonic acid | | — | — | — | 6% | — | — |
| | Polyallylamine polymer | | — | — | — | — | 6% | — |
| Other solvents | 1,2-hexanediol | 224 | 5% | 5% | 5% | 5% | 5% | 5% |
| Nitrogen containing solvent | 2-pyrrolidone | 245 | 15% | 5% | 20% | 15% | 15% | 15% |
| Surfactant | BYK 348 | | 1% | 1% | 1% | 1% | 1% | 1% |
| Pure water | | | Residue | Residue | Residue | Residue | Residue | Residue |
| Total | | | 100 | 100 | 100 | 100 | 100 | 100 |

The components indicated in Table 2 are as follows.

Aggregating Agent

Magnesium sulfate

Malonic acid

Polyallylamine polymer (product name, "PAA-05", prepared by NITTOBO MEDICAL Co., Ltd.)

Malonic acid

Surfactant

BYK 348 (product name, silicone surfactant, prepared by BYK Additives & Instruments)

3.3. Evaluation Test 3.3.1. Recording Test

A recording medium was transported to a modifier of an ink jet printer (product name, "SC-S30650", manufactured by SEIKO EPSON CORPORATION), and a head was filled with ink and a treating liquid. First, the treating liquid was ink-jet coated at a resolution of 1440×1440 dpi with 1.0 mg/inch$^2$ of attachment amount. Next, the recording medium was rewound, and a treating liquid layer was ink-jet coated again with ink with 10.0 mg/inch$^2$ of attachment amount. At the time of recording, a platen heater was activated so as to attach the treating liquid and ink to the heated recording medium. At that time, the platen heater was controlled such that the surface temperature of the recording medium becomes the primary drying temperature as indicated in Table 3. After recording, the recording medium was discharged from the printer, and dried at 80° C. for five minutes.

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Treating liquid | Treating liquid 1 | Treating liquid 1 | Treating liquid 3 | Treating liquid 3 | Treating liquid 1 | Treating liquid 4 | Treating liquid 5 | Treating liquid 3 | Treating liquid 3 | Treating liquid 3 |
| Ink | Ink 1 | Ink 2 | Ink 3 | Ink 4 | Ink 5 | Ink 1 | Ink 1 | Ink 3 | Ink 3 | Ink 3 |
| Content of nitrogen-containing solvent of treating liquid (% by mass) | 15 | 15 | 20 | 20 | 15 | 15 | 15 | 20 | 20 | 20 |
| Content of nitrogen-containing solvent of ink (% by mass) | 10 | 5 | 15 | 15 | 5 | 10 | 10 | 15 | 15 | 15 |
| Difference in content of nitrogen-containing solvent (% by mass) (treating liquid-ink) | 5 | 10 | 5 | 5 | 10 | 5 | 5 | 5 | 5 | 5 |
| Ink nitrogen-containing solvent amount: treating liquid nitrogen-containing solvent amount | < | < | < | < | < | < | < | < | < | < |
| Types of recording medium | Recording medium 1 | Recording medium 1 | Recording medium 1 | Recording medium 1 | Recording medium 1 | Recording medium 1 | Recording medium 1 | Recording medium 1 | Recording medium 1 | Recording medium 1 |
| Primary drying temperature (° C.) | 40 | 40 | 40 | 40 | 40 | 40 | 40 | 35 | 40 | 40 |
| Head type | Head 1 | Head 1 | Head 1 | Head 1 | Head 1 | Head 1 | Head 1 | Head 1 | Head 2 | Head 3 |
| Color development | A | A | A | B | A | B | B | B | A | A |
| Abrasion resistance | A | B | A | C | A | A | A | A | A | A |
| Discharge stability (ink) | A | A | B | A | B | A | A | A | A | A |
| Discharge stability (reaction liquid) | A | A | A | A | A | A | A | A | A | A |

| | Example 11 | Example 12 | Comparative Example 1 | Comparative Example 2 | Comparative Example 3 | Comparative Example 4 | Comparative Example 5 | Reference Example 1 | Reference Example 2 |
|---|---|---|---|---|---|---|---|---|---|
| Treating liquid | Treating liquid 1 | Treating liquid 6 | Treating liquid 2 | Treating liquid 2 | Treating liquid 2 | Treating liquid 2 | — | Treating liquid 2 | Treating liquid 1 |
| Ink | Ink 1 | Ink 2 | Ink 3 | Ink 6 | Ink 2 | Ink 1 | Ink 3 | Ink 3 | Ink 1 |
| Content of nitrogen-containing solvent of treating liquid (% by mass) | 15 | 15 | 5 | 5 | 5 | 5 | — | 5 | 15 |
| Content of nitrogen-containing solvent of ink (% by mass) | 10 | 5 | 15 | 20 | 5 | 10 | 15 | 15 | 10 |
| Difference in content of nitrogen-containing solvent (% by mass) (treating liquid-ink) | 5 | 10 | −10 | −15 | 0 | −5 | — | −10 | 5 |
| Ink nitrogen-containing solvent amount: treating liquid nitrogen-containing solvent amount | < | < | > | > | = | > | — | > | < |
| Types of recording medium | Recording medium 2 | Recording medium 1 | Recording medium 1 | Recording medium 1 | Recording medium 1 | Recording medium 1 | Recording medium 1 | Recording medium 3 | Recording medium 3 |
| Primary drying temperature (° C.) | 40 | 40 | 40 | 40 | 40 | 40 | 40 | 40 | 40 |
| Head type | Head 1 | Head 1 | Head 1 | Head 1 | Head 1 | Head 1 | Head 1 | Head 1 | Head 1 |
| Color development | A | C | A | A | A | A | C | A | A |
| Abrasion resistance | B | A | D | B | D | D | D | A | A |
| Discharge stability (ink) | | | | | | | | | |
| Discharge stability (reaction liquid) | A | A | A | A | A | A | — | A | A |

In Table 3, each of the head type means as follows.

Head 1: The ink jet head includes a step and a stagnation portion as illustrated in FIG. 2. A nozzle plate was obtained by etching a silicon layer to form a nozzle.

Head 2: The structure is the same as that of the head 1. The nozzle plate was obtained mechanically drilling a metal layer to form a nozzle. Here, the head 2 is a head which is not suitable for mass production, and is difficult to manufacture.

Head 3: In the ink jet head as illustrated in FIG. 2, a pressure chamber which includes a nozzle was formed at an end thereof, and includes no ink retention portion in the extending direction was formed. Here, the head 3 is a head which is not suitable for mass production, and is difficult to manufacture.

In addition, in Table 3, the ratio of an ink nitrogen-containing solvent amount to a treating liquid nitrogen-containing solvent amount is obtained by comparing the content of the nitrogen-containing solvent (% by mass) contained in the ink with the content of the nitrogen-containing solvent (% by mass) the contained in the treating liquid, and a case where the content of the nitrogen-containing solvent (% by mass) contained in the ink is less than the content of the nitrogen-containing solvent (% by mass) contained in the treating liquid is represented by "<", a case where the content of the nitrogen-containing solvent (% by mass) in the ink is greater than the content of the nitrogen-containing solvent (% by mass) contained in the treating liquid is represented by ">", and a case where the contents (ratio) thereof are the same as each other is represented by "=".

Recording Medium

As the recording medium, the following three types of recording mediums were used. Note that, the surface the step of the recording medium was measured by, for example, observing the section of the recording medium with a field emission scanning electron microscope (product name "S-4700", manufactured by Hitachi, Ltd.), measuring a difference between the highest and lowest place in the observed field of view, changing the observation field of view, and then calculating as an average value of 50 places randomly measured in different visual fields. The magnification at observation was 1000 times.

Recording medium 1: Embossed vinyl chloride film, product name Erfurt Wall paper DV615, manufactured by Erfurt, 82 μm of surface step Recording medium 2: Tarpaulin made of vinyl chloride, product name IJ8451, prepared by 3M company, 145 μm of surface step Recording medium 3: Glossy polyvinyl chloride sheet, product name "SV-G-1270G", manufactured by Roland Corporation, 3 μm of surface step Evaluation of Color Development An OD value of the ink in a recorded portion of the obtained recorded material was measured and the recorded material was evaluated according to the following criteria. For the measurement, a spectrophotometer/spectroradiometer Spectrolino (product name, manufactured by Gretag Co.) was used.

Evaluation Criteria

A: OD value of recorded portion is equal to or greater than 1.0.

B: OD value of recorded portion is equal to or greater than 0.7 and less than 1.0.

C: OD value of recorded portion is less than 0.7.

3.3.2. Abrasion Resistance

After allowing the recorded material obtained by the above recording test to stand for one hour in a laboratory under the condition of room temperature (25° C.), by confirming the ink peeling state of the recording surface and ink transfer state to cotton cloth when the recorded material with 200 g of load was rubbed 20 times by Gakushin-type rubbing tester AB-301 (manufactured by Tester Sangyo), the abrasion resistance was evaluated based on the following criteria.

Evaluation Criteria

A: There is no scratch or peeling.

B: There are scratches or peelings of equal to or less than 1% of stroke area.

C: There are scratches or peelings of equal to or greater than 1% and less than 10% of stroke area.

D: There are scratches or peelings of equal to or greater than 10% of stroke area.

3.3.3. Head Clogging Properties

Discharge Stability

The recording was continuously performed for two hours in the same manner as in the recording test. After completion of the recording, cleaning was performed so to discharge 1 cc of ink from the nozzle row (180 nozzles) by suction cleaning. The suction cleaning was performed for each treating liquid nozzle row and ink nozzle row, and was evaluated based on the following criteria.

Evaluation Criteria

A: The number of times of cleaning required for discharge recovery for all nozzles is equal to or less than one.

B: The number of times of cleaning required for discharge recovery for all nozzles is two.

C: The number of times of cleaning required for discharge recovery for all nozzles is equal to or more than three.

3.4. Evaluation Result

The results of the evaluation test will be indicated in Table 3.

In any example, it was possible to form an image with excellent abrasion resistance, and excellent results were obtained in ink discharge stability. In particular, when comparing Example 2 with Example 12, evaluation of color development was higher when the treating liquid contained an aggregating agent. When the treating liquid containing the aggregating agent is used, there is tendency that the abrasion resistance of recorded material is deteriorated instead of improving the color development; however, in Example 2, evaluation of the abrasion resistance is B, which indicates that the invention is particularly useful.

In addition, according to Examples 1, 3, and 4, when the content of the nitrogen-containing solvent in the ink is increased, the head is clogged and the discharge stability is slightly lowered. However, even in that case, when the ink contained a high boiling point solvent, the discharge stability was recovered. On the other hand, when the ink contained the high boiling point solvent, the color development and the abrasion resistance were slightly deteriorated. From Example 5, as the amount of resin in the ink is increased, the discharge stability is slightly deteriorated even if the content of the nitrogen-containing solvent in the ink was small. According to Examples 1, 6, and 7, as an aggregating agent in the treating liquid, magnesium sulfate was preferable in terms of the color development.

According to Examples 8 to 10, even when the pressure chamber had the step and ink retention part, nozzle clogging was suppressed and the discharge stability was excellent. In addition, as compared with Example 11, abrasion resistance could be ensured even in the case of using the recording medium 1 having a large unevenness difference.

In contrast, in Comparative Example 5 in which the treating liquid is not used, both of the color development and the abrasion resistance were deteriorated as a result, and in Comparative Examples 1 to 4 in which the treating liquid having the content of the nitrogen-containing solvent which is lower than or the same value as the ink composition was attached, the color development was excellent while the abrasion resistance was deteriorated inferior. Particularly, in Comparative Example 2, since the content of the nitrogen-containing solvent in the ink is large, the nozzle clogging occurred, and the discharge stability was deteriorated as well. Note that, according to Reference Examples 1 and 2, in a case of using a recording medium with little unevenness, the problem of abrasion resistance deterioration did not occur, but it could not be recorded material with unique texture.

As described above, in Examples, when the treating liquid in which the content of the nitrogen-containing solvent is greater than the ink composition is attached to the recording medium before the attachment of the ink composition, it is possible to secure the solubility of the resin of the ink in the convex portion of the recording medium and to record an image excellent in the abrasion resistance. In addition, when the treating liquid in which the content of the nitrogen-containing solvent is greater than the ink composition is attached to the recording medium before the attachment of the ink composition, it was possible to attach a certain amount of nitrogen-containing solvent on the surface of the recording medium the attachment of the ink composition, and thus it was possible to decrease the content of the nitrogen-containing solvent in the ink composition, and to suppress the dissolution of the resin contained in the ink by the nitrogen-containing solvent in the ink jet head. With this, it was possible to prevent the clogging of the ink jet head and nozzle, and thereby it was possible to provide an ink jet recording method excellent in the discharge stability.

The invention is not limited to the above-described embodiments, and various modifications are possible. For example, the invention includes a configuration substantially the same as that described in the embodiment (for example, a configuration having the same function, method, and result, or a configuration having the same object and effect). Further, the invention includes a configuration in which non-essential parts of the configuration described in the embodiment are replaced. Further, the invention includes a configuration that can achieve the same effects as the configuration described in the embodiment, or a configuration that can achieve the same object. In addition, the invention includes a configuration in which a well-known technique is added to the configuration described in the embodiment.

The entire disclosure of Japanese Patent Application No. 2017-031012, filed Feb. 22, 2017 is expressly incorporated by reference herein.

What is claimed is:

1. An ink jet recording method comprising:

attaching a treating liquid, in which a content of a nitrogen-containing solvent is greater than that of an ink composition, to a recording medium having low or non-absorbability in which a step of surface unevenness is equal to or greater than 10 μm; and attaching the ink composition containing the nitrogen-containing solvent by discharging the ink composition from an ink jet head to the recording medium to which the treating liquid is attached, wherein the content of the nitrogen-containing solvent in the treating liquid is 15% by mass or more.

2. The ink jet recording method according to claim 1, wherein the recording medium has a recording surface with a resinous front surface.

3. A method of controlling an ink jet recording apparatus, the method comprising:

controlling an ink jet recording apparatus to perform recording by the ink jet recording method according to claim 2.

4. The ink jet recording method according to claim 1, wherein the treating liquid contains an aggregating agent for aggregating components of the ink composition.

5. A method of controlling an ink jet recording apparatus, the method comprising:

controlling an ink jet recording apparatus to perform recording by the ink jet recording method according to claim 4.

6. The ink jet recording method according to claim 1, wherein the content of the nitrogen-containing solvent in the treating liquid is in a range of 15% by mass to 25% by mass, and the content of the nitrogen-containing solvent in the ink composition is in a range of 1% by mass to 23% by mass.

7. A method of controlling an ink jet recording apparatus, the method comprising:

controlling an ink jet recording apparatus to perform recording by the ink jet recording method according to claim 6.

8. The ink jet recording method according to claim 1, wherein in the ink composition, a content of an organic solvent having a standard boiling point of equal to or higher than 280° C. is equal to or less than 3% by mass.

9. The ink jet recording method according to claim 1, wherein the ink composition contains an organic solvent having low permeability with respect to the recording medium as compared with the nitrogen-containing solvent.

10. The ink jet recording method according to claim 1, wherein a step of surface unevenness of the recording medium is in a range of 10 μm to 200 μm.

11. The ink jet recording method according to claim 1, wherein the ink jet head has a step in a flow path through which the ink composition passes between a pressure chamber and a nozzle.

12. The ink jet recording method according to claim 1, wherein a pressure chamber of the ink jet head includes a retention portion in which the ink composition is retained in a direction extending from an outflow port in an ink movement direction which is formed by connecting a supply port through which the ink composition is supplied to the pressure chamber to the outflow port to which the ink composition outflows from the pressure chamber.

13. The ink jet recording method according to claim 1, wherein the ink composition contains a resin.

14. A method of controlling an ink jet recording apparatus, the method comprising:

controlling an ink jet recording apparatus to perform recording by the ink jet recording method according to claim 1.

15. The ink jet recording method according to claim 1, wherein a step of surface unevenness of the recording medium is equal to or greater than 50 μm.

16. The ink jet recording method according to claim 1, wherein a step of surface unevenness of the recording medium is equal to or greater than 70 μm.

17. The ink jet recording method according to claim 1, wherein the recording medium is a resin recording medium which has an uneven tone texture on a surface.

18. The ink jet recording method according to claim 1, wherein the content of a nitrogen-containing solvent of the ink composition is 5.0% by mass or more with respect to the total mass of the ink composition.

19. The ink jet recording method according to claim 1, wherein the ink composition contains a resin component, and the resin component is in a fine particle state.

20. The ink jet recording method according to claim 1, wherein the treating liquid contains an aggregation agent for aggregating components of the ink composition, and the aggregation agent includes a polyvalent metal salt, a cationic compound, or an organic acid.

* * * * *